United States Patent
Wentz

(10) Patent No.: US 11,601,272 B2
(45) Date of Patent: Mar. 7, 2023

(54) METHODS AND SYSTEMS FOR EFFICIENT CRYPTOGRAPHIC THIRD-PARTY AUTHENTICATION OF ASSET TRANSFERS USING TRUSTED COMPUTING

(71) Applicant: Ares Technologies, Inc., Boston, MA (US)

(72) Inventor: Christian T Wentz, Providence, RI (US)

(73) Assignee: Ares Technologies, Inc., Boston, MA (US)

( * ) Notice: Subject to any disclaimer, the term of this patent is extended or adjusted under 35 U.S.C. 154(b) by 316 days.

(21) Appl. No.: 16/861,599

(22) Filed: Apr. 29, 2020

(65) Prior Publication Data

US 2020/0351089 A1   Nov. 5, 2020

Related U.S. Application Data

(60) Provisional application No. 62/841,964, filed on May 2, 2019.

(51) Int. Cl.
| | |
|---|---|
| *H04L 9/32* | (2006.01) |
| *G06Q 20/40* | (2012.01) |
| *G06Q 20/38* | (2012.01) |
| *G06Q 20/10* | (2012.01) |

(52) U.S. Cl.
CPC ........... *H04L 9/321* (2013.01); *G06Q 20/108* (2013.01); *G06Q 20/3825* (2013.01); *G06Q 20/3827* (2013.01); *G06Q 20/401* (2013.01); *H04L 9/3218* (2013.01); *H04L 9/3226* (2013.01); *H04L 9/3236* (2013.01); *H04L 9/3247* (2013.01); *H04L 9/3278* (2013.01); *H04L 9/3297* (2013.01); *G06Q 2220/00* (2013.01); *H04L 2209/56* (2013.01)

(58) Field of Classification Search
CPC ..... H04L 9/321; H04L 9/3218; H04L 9/3226; H04L 9/3236; H04L 9/3247; H04L 9/3278; H04L 9/3297; H04L 2209/56; H04L 9/3234; G06Q 20/3825; G06Q 20/3827; G06Q 20/401; G06Q 2220/00
USPC ......... 713/155, 159, 161, 168, 170; 726/2, 5
See application file for complete search history.

(56) References Cited

U.S. PATENT DOCUMENTS

| | | |
|---|---|---|
| 8,150,767 B2 | 8/2012 | Wankmueller |
| 8,924,301 B2 | 12/2014 | Lindelsee et al. |
| 9,355,391 B2 | 5/2016 | Von Behren |

(Continued)

*Primary Examiner* — Izunna Okeke
(74) *Attorney, Agent, or Firm* — Caldwell Intellectual Property Law

(57) ABSTRACT

A system for efficient third-party authentication of asset transfers using trusted computing includes a process authentication node configured to receive transfer data relating to an asset transfer, wherein the transfer data includes at least a first authentication datum, retrieve, from an instance of a secure listing, a first digitally signed assertion including at least a second authentication datum, wherein the first digitally signed assertion is generated by a data validator device as a function of information of a transferring entity, compare the at least a first authentication datum to the at least a second authentication datum, and authenticate the transfer data as a function of the comparing of the at least a first authentication datum to the at least a second authentication datum.

18 Claims, 5 Drawing Sheets

(56) References Cited

U.S. PATENT DOCUMENTS

| | | | |
|---|---|---|---|
| 2012/0260093 A1* | 10/2012 | Benson | G06Q 20/02 |
| | | | 713/170 |
| 2015/0120472 A1 | 4/2015 | Aabye | |
| 2015/0254642 A1 | 9/2015 | Bondesen et al. | |
| 2017/0200155 A1 | 7/2017 | Fourez et al. | |
| 2018/0248706 A1* | 8/2018 | Wallrabenstein | H04L 9/3278 |

* cited by examiner

METHODS AND SYSTEMS FOR EFFICIENT CRYPTOGRAPHIC THIRD-PARTY AUTHENTICATION OF ASSET TRANSFERS USING TRUSTED COMPUTING

CROSS-REFERENCE TO RELATED APPLICATIONS

This application claims the benefit of priority of U.S. Provisional Patent Application Ser. No. 62/841,964 filed on May 2, 2019 and entitled "METHODS AND SYSTEMS FOR EFFICIENT CRYPTOGRAPHIC THIRD-PARTY AUTHENTICATION OF ASSET TRANSFERS USING TRUSTED COMPUTING," which is incorporated by reference herein in its entirety.

FIELD OF THE INVENTION

The present invention generally relates to the field of computer security and cryptography. In particular, the present invention is directed to methods and systems for efficient cryptographic third-party authentication of asset transfers using trusted computing.

BACKGROUND

Authentication and authorization protocols for asset transfers are complex and often require multiple steps and communications between different devices to perform needed authentication and settling processes. Frequently, this can waste time and cause delays. In addition, data used for such authentication and verification is often kept in centralized locations, leading to an over-dependence on current network connectivity.

SUMMARY OF THE DISCLOSURE

In an aspect, a method of efficient cryptographic third-party authentication of an asset transfer includes receiving, at a process authentication node, transfer data relating to an asset transfer, wherein the transfer data includes at least a first authentication datum, retrieving, by the process authentication node, from an instance of a secure listing, a first digitally signed assertion including at least a second authentication datum, wherein the first digitally signed assertion is generated by a data validator device as a function of information of a transferring entity, comparing, by the process authentication node, the at least a first authentication datum to the at least a second authentication datum, and authenticating, by the process authentication node, the transfer data as a function of the comparing of the at least a first authentication datum to the at least a second authentication datum.

In an aspect, a system for efficient third-party authentication of asset transfers using trusted computing includes a process authentication node configured to receive transfer data relating to an asset transfer, wherein the transfer data includes at least a first authentication datum, retrieve, from an instance of a secure listing, a first digitally signed assertion including at least a second authentication datum, wherein the first digitally signed assertion is generated by a data validator device as a function of information of a transferring entity, compare the at least a first authentication datum to the at least a second authentication datum, and authenticate the transfer data as a function of the comparing of the at least a first authentication datum to the at least a second authentication datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 4 illustrates particular implementations of various steps of a method for remotely pre-authorizing asset transfers; and.

Figure 1:
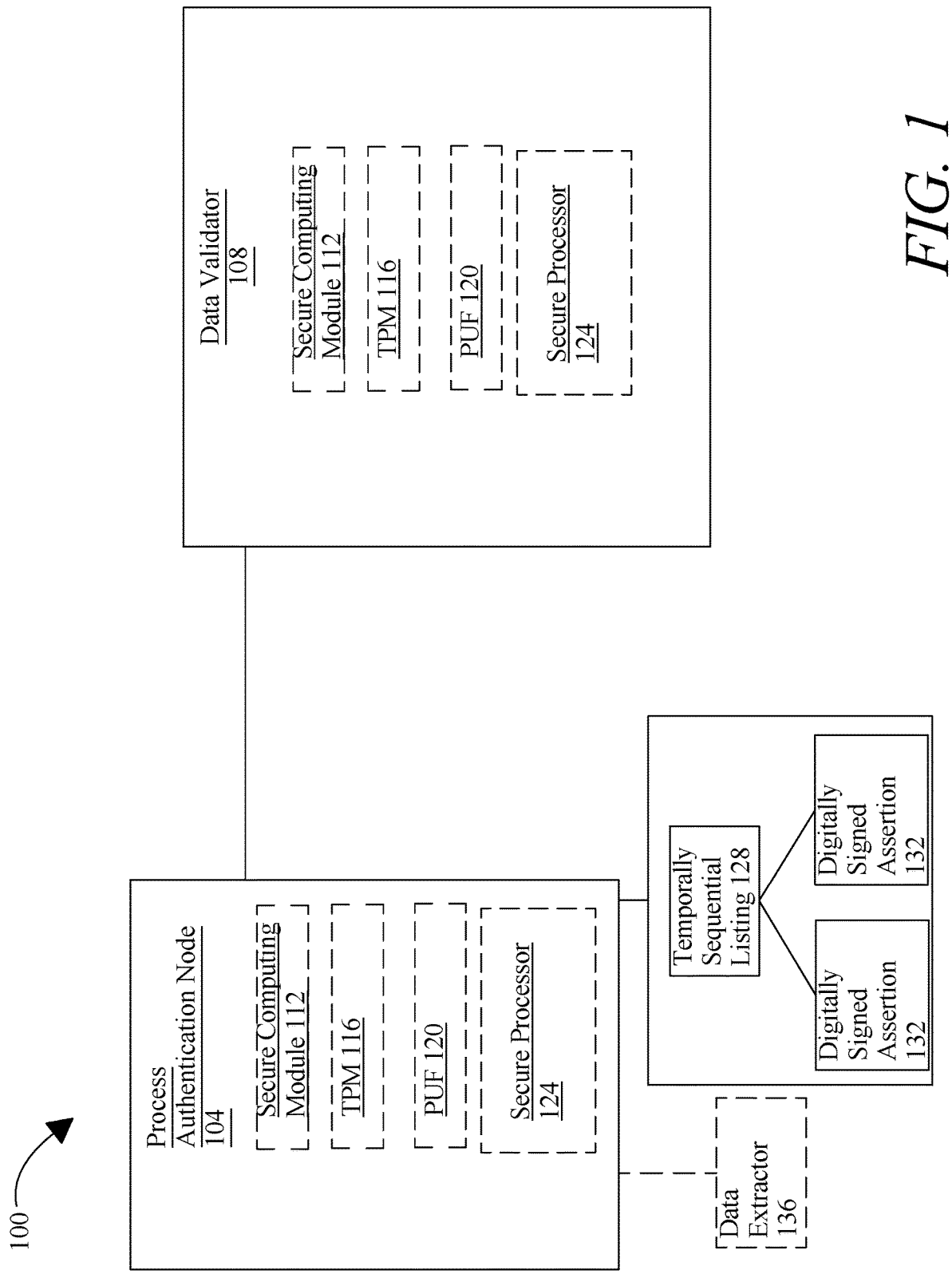
FIG. 1 is a block diagram illustrating an exemplary embodiment of a system for efficient cryptographic third-party authentication for asset transfers using trusted computing.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to efficient methods of cryptographic third-party authentication of asset transfers using trusted computing. Embodiments of the present disclosure may shorten process time by replacing communication with a third-party entity that performs authentication and processing with more localized, cryptographically enabled protocols, yielding a rapid and robust process. Embodiments disclosed herein may create such efficiencies by utilizing highly trusted entries on a secure listing which may "stand in" for a device or process operated by a third party. Trusted entries on a secure listing may be authenticated by identifying a device that posts the resulting transfer; the device may be definitively linked to a third-party institution.

Systems and methods as described herein may involve computation, calculation, assessment, assignment, or use of a confidence level associated with one or more processes, devices, or data, including without limitation one or more processes, appraisals, and/or cryptographic evaluators as described herein. Confidence level, as used herein, is an element of data expressing a degree to which the safety, security, or authenticity of a process, device, or datum may be relied upon. As used herein, a confidence level may include a numerical score; numerical score may be a score on a scale having one extremum representing a maximal degree of reliability, and a second extremum representing a minimum degree of reliability. As a non-limiting example, extremum representing maximal degree of reliability may be a maximal number of an ordered set of numbers such as an open or closed set on the real number line, a sequential listing of integers or natural numbers, or the like; persons skilled in the art will be aware that selection of a numerical extremum to represent a higher level of confidence or reliability, albeit intuitively pleasing, is not mathematically necessary, and any suitable mapping of level of confidence or reliability to numerical objects or ranges may feasibly be substituted. As a further non-limiting example, numerical score may include, or be mappable to, a probability score, such as a percentage probability or a 0-1 probability level. Confidence level may include further information or indications, such as without limitation flags denoting untrustworthy, suspect, or hostile elements; for instance a flag may indicate that a particular device, program, process, or element of data appears to be compromised and/or has been involved in fraudulent or otherwise hostile or disruptive engagement with system 100 and/or methods described herein in the past. Methods of aggregating, computing, and/or using confidence levels will be described in further detail below. Persons skilled in the art, upon reviewing the entirety of this disclosure, will be aware of various ways in which confidence levels may be implemented, calculated, assigned, and/or used as consistent with methods and systems disclosed herein.

In an embodiment, methods and systems described herein may perform implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. A further example of an asymmetric cryptographic system may include a discrete-logarithm based system based upon the relative ease of computing exponents mod a large integer, and the computational infeasibility of determining the discrete logarithm of resulting numbers absent previous knowledge of the exponentiations; an example of such a system may include Diffie-Hellman key exchange and/or public key encryption. Another example is elliptic curve cryptography, which relies on the fact that given two points P and Q on an elliptic curve over a finite field, a definition of the inverse of a point –A as the point with negative y-coordinates, and a definition for addition where A+B=–R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q. A further example of asymmetrical cryptography may include lattice-based cryptography, which relies on the fact that various properties of sets of integer combination of basis vectors are hard to compute, such as finding the one combination of basis vectors that results in the smallest Euclidean distance. Embodiments of cryptography, whether symmetrical or asymmetrical, may include quantum-secure cryptography, defined for the purposes of this disclosure as cryptography that remains secure against adversaries possessing quantum computers; some forms of lattice-based cryptography, for instance, may be quantum-secure.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamperproofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")—family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Referring now to FIG. 1, an exemplary embodiment of a system 100 for efficient third-party authentication of asset transfers using trusted computing is illustrated. System 100 includes a process authentication node 104. Process authentication node 104 may include any computing device, or combination of computing devices, as described below in reference to FIG. 5. Process authentication node 104 may include a single computing device operating independently, or may include two or more processors operating in concert, in parallel, sequentially or the like; two or more processors may be included together in a single computing device or in two or more computing devices.

With continued reference to FIG. 1, process authentication node 104 may act to authenticate information of a first party seeking to perform a third-party authenticated asset transfer to a second party. Such a third-party authenticated asset transfer, which will be equivalently referred to in this disclosure as an "asset transfer," is a process whereby a first party, transferring entity, and/or transferor pays a second party or transferee through an electronic transfer of assets from an account operated by a third party. First party or transferor, and second party or transferee, may, for instance, be a human being, corporation, sole proprietorship, partnership, limited liability corporation, bank account, merchant, bank, and any combination thereof. Third party may, for instance, be a bank or other financial institution, and first party may be a person or entity having an account with the third party; the account may include, without limitation, a credit account, debit account, or other account enabling electronic payment, whether on the basis of debt to the third party (such as in the case of a credit account) or funds held by the third party on behalf of the first party (for instance as in the case of a checking or savings account). Asset transfer as defined herein may typically require authentication of first party by third party via electronic communication; subsequent or additional communications to approve transfer amounts and "settle" payments may typically also be required to complete the pertinent transfer. An asset transfer may include the transfer of tangible or intangible assets such as but not limited to money, currency, digital funds, digital currency, coins, legal tender, funds, and bills; this may occur through third party payment systems such as electronic funds transfers, wire transfers, giro, money orders, peer to peer transfers, merchant processor, online bill payment, bank transfer terminal, Square Cash, Venmo, Chase QuickPay, Zelle, Popmoney, Paypal, Facebook Messenger, Google Wallet, OFX, Western Union, and/or digital wallet transfers. Process authentication node 104 may include a computing device or set of computing devices requesting authentication of an asset transfer. As a non-limiting example, process authentication node 104 may include a point-of-sale device, such as a computing device operated by a retail establishment to process electronic payments, a device in communication with a point-of-sale device, such as a server or other remote device receiving communication of asset transfers to be authenticated from a point-of-sale device, an online point-of-sale device, such as a device that receives payments for goods or services at a web-based market or ecommerce site, or the like.

With continued reference to FIG. 1, system 100 may include a data validator device 108. Data validator device 108 may be a device operated by a third party to perform asset transfers as defined herein, including without limitation a device operated by a bank or similar institution. Data validator device 108 may be a device that would ordinarily authenticate asset transfer; for instance data validator device 108 may be a device that would typically receive authentication information relating to a prospective asset transfer, compare the authentication information to stored authentication information at the data validator device 108 or a data store accessible thereto, and validate the asset transfer based upon the comparison. Data validator device 108 may include any device or combination of devices suitable for use as process authentication node 104 as described above. Data validator device 108 may include single processor operating independently, or may include two or more processors operating in concert, in parallel, sequentially or the like; two or more processors may be included together in a single computing device or in two or more computing devices. Data validator device 108 may be a remote device not directly and physically attached to process authentication node 104. Data validator device 108 may, for instance, connect to a network, which may include wired, wireless and other electronic data connections between devices, such as without limitation the Internet, to which process authentication node 104 also may connect; data validator device 108 may not be connected to the network at the same time as the process authentication node 104. Process authentication node 104 may communicate with the data validator device 108 over a wireless network. Process authentication node 104 may communicate with a plurality of the data validator devices 112 across multiple networks.

With continued reference to FIG. 1, any computing devices in system 100, including without limitation process authentication node 104 and/or data validator device 108 may include a secure computing module 112. As used herein, a secure computing module 112 is a hardware element configured to perform one or more secured operations beyond the control of other circuit elements or software, whether incorporated with the secure computing module 112 in a circuit or computing device, or a part of an extrinsic computing device. As a result, at least one secured operation performed by secure computing module 112 may be intrinsically reliable; that is, the at least one secured operation may be relied upon by any other module or user to produce an expected result regardless of behavior by neutral or adversarial parties, as long as some basic set of assumptions hold true. Other parties may be able to assign a confidence level in secure computing module 112 and/or a system or computing device incorporating the secure computing module 112 based on the above-described set of assumptions. As a non-limiting, example, a secure computing module 112 designed to produce an expected result despite all software-only attacks may give rise to a first confidence level, whereas another secure computing module 112 designed to produce its expected result in the face of all software or hardware attacks may give rise to a second confidence level; the second confidence level may be higher, owing to the reduced probability that the second secure computing module 112 would be compromised.

Still viewing FIG. 1, a secure computing module 112 may include a trusted platform module (TPM) 116. In an embodiment, a TPM 116 may include a hardware module, which may be an integrated circuit, an optoelectronic circuit, a section of an integrated circuit on the same die as a processor, an integrated circuit packaged with other die in a multi-chip module or other multi-die integration method, or printed circuit board product; the TPM 116 may have any suitable elements of digital or analog circuitry usable to perform one or more processes as described herein, including without limitation processes used to determine confidence levels and/or authenticate digitally signed assertions as described below. A TPM 116 may have memory and/or other logic and/or a processor in its own right which may be in a non-limiting example a crypto processor. A TPM 116 may have a hard-coded process for signing a digital signature as described in further detail below, which may be performed without limitation using a private key, which is associated with a public key. This private key and/or signing process may be produced using a genuinely random process during manufacturing, and/or unique object (UNO) fingerprint, and/or a physically unclonable function (PUF), or any other disorder-based security primitive, defined as a function that creates challenge responses from a physical circuit that depend on unique features of that circuit, including without limitation microstructure features or elements that depend on random physical factors occurring or conferred during manufacture. Private key may be extracted via physically unclonable function processes using, for instance, a fuzzy extractor or key extractor physically unclonable function. Private key extraction may utilize additional corrective measures, including as a nonlimiting example machine learning, neural networks, convolutional neural networks and the like, or other approaches to provide error correction over the operating temperature range of the device. Private key generation may additionally incorporate true random number generator(s) (TRNGs), pseudorandom number generators (PRNGs) and related devices.

With continued reference to FIG. 1, a secure computing module 112 may include at least PUF 120. A PUF 120 may be implemented by various means. In an embodiment, a PUF 120 includes one or more non-intrinsic PUFs. Non-intrinsic PUFs may include without limitation optics based PUFs. Optics-based PUFs may include, as a nonlimiting example, optical PUFs. An optical PUF may be implemented by combining a light source such as lasers with a material that causes unpredictable scattering from the light source; one or more light sensors or light sensor arrays may be used to detect scattered light and output an electrical signal, for instance by generating, at a given light sensor unit, a logic 1 signal for detected light above a given threshold intensity or energy content, and a logic 0 signal for detected light below such threshold. Each light sensor may include any suitable device for converting light to an electrical signal; such devices include, without limitation, avalanche photodiodes (APDs), single photon avalanche diodes (SPADs), silicon photo-multipliers (SiPMs), photo-multiplier tubes (PMTs), micro-channel plates (MCPs), micro-channel plate photomultiplier tubes (MCP-PMTs), photodiodes, and/or photosensitive or photon-detecting circuit elements and/or transducers. Avalanche photo diodes (APDs), as used herein, may include diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. When the reverse bias is less than the breakdown voltage, the gain of the APD is approximately linear. For silicon APDs this gain is on the order of 10-100. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. Persons skilled in the art, upon reviewing the entirety of this disclosure, will be aware of various alternative or additional light detection devices that may be used to detect light scattered by scattering medium.

Still referring to FIG. 1 a non-intrinsic PUF may include without limitation a radio frequency (RF)-based PUF. A radio-frequency PUF may be constructed by embedding thin, randomly arranged copper wires in flexible silicone sealant or other RF permissive medium to be exposed to a source of electromagnetic waves, which may, in a non-limiting example, emit in the 5-6 GHz band; near-field scattering of such waves may be detected, for instance, using a matrix of antennas to produce an "RF-DNA PUF" secret. near-field scattering of EM waves by the copper wires may be measured, for instance in a 5-6 GHz band; RF-DNA PUFs. Alternatively, an RF-based PUF may be fabricated as an inductor-capacitor (LC) PUF by for instance by incorporating a capacitor, such as a glass plate with metal plates on both sides, serially chained with a passive inductor such as a metal coil on the glass plate; this may form a passive LC resonator circuit which may absorb some amount of power when placed in an external RF field, using for instance an RF emitter as described above. A frequency sweep may indicate the circuit resonant frequencies, which depend on the capacitive and inductive components. Manufacturing variations in the construction may lead to resonant peak variations, the detection of which may generate secret. Persons skilled in the art, upon reviewing the entirety of this disclosure, will be aware of various alternative, additional, or modified methods, means, and/or procedures suitable for use in fabrication of the above described PUFs, or of modification of methods for construction of RF PUFs to be compatible with fabrication of other elements, or with methods of fabrication thereof, as disclosed herein, including without limitation CMOS fabrication.

With continued reference to FIG. 1, a non-intrinsic PUF may include one or more electronics based PUFs. Electronics-based PUFs may include, as a nonlimiting example, coating PUFs. In a non-limiting example of a coating PUF, a comb-shaped sensor may be fabricated on the surface of an integrated circuit. A passive dielectric coating may be sprayed directly on the surface, where the dielectric particles are dispersed randomly. Capacitance measurements between sensors may be used as identifiers. Opaque and chemically inert coating may offer further protection. Non-intrinsic PUFs may include power distribution network PUFs. Power distribution network PUFs may be based on resistance variations in a power grid of a silicon chip. Voltage drops and equivalent resistances in power distribution system may be measured and subject to random manufacturing variability. Additional non-intrinsic PUFs may include, without limitation, compact disc (CD)-based PUFs. For instance, measured lengths of lands and pits on a CD may exhibit a random deviation from their intended lengths due to fabrication process variations. This variation may be large enough to be observed by monitoring the electrical signal of the photodetector in a CD player. Non-intrinsic PUFs may include acoustical PUFs, which may be constructed by observing the characteristic frequency spectrum of an acoustical delay line, where a bit string is extracted by performing principal component analysis. Non-intrinsic PUFS may include magstripe-based PUFs, which may leverage randomness of particle patterns in magnetic media (for instance in magnetic swipe cards). These types of PUFs may be used commercially to prevent credit card fraud. In all examples, the bit string may be obtained by a number of mathematical processes, for example independent component analysis (ICA), principal component analysis (PCA), signal power spectral density (PSD) etc.

In an embodiment, and still referring to FIG. 1, a PUF 120 may include an "intrinsic PUF" produced via semiconductor construction, including without limitation the fabrication of semiconductor circuit elements based on silicon. As a non-limiting example, a pair of paths may be simulated with identical properties in a design of an integrated circuit; upon fabrication based on simulation, signals may propagate around each path of the pair of paths at a slightly different rate than the other path of the pair of paths. Fabrication may further include fabrication of an "arbiter" component connected to the two paths, the arbiter component configured to generate a first output if a signal arrives first from a first path of the two paths and a second output if a signal arrives first from a second path of the two paths; first output and second output may correspond, as a non-limiting example, to digital values such as logic 1 and logic 0. A plurality of such constructions may be combined to produce a plurality of randomly generated output bits. Other such race-condition PUFs may be similarly constructed. In an embodiment, an intrinsic PUF circuit may be manufactured by fabricating a circuit including two multiplexors, two counters, one comparator, and a plurality of ring oscillators; each oscillator may connect to an input of the two multiplexors, which may be configured to select two ring oscillators to compare, while the counters count the number of oscillations per a time period, and the output is set to 0 if one counter has a higher value and 1 if another counter has a higher value. Multiple such combinations may be used to generate a plurality of bits.

With continued reference to FIG. 1, intrinsic PUFs may include asynchronous PUFs, which may be synonymous with Self-Timed Ring PUFs. These may possess the same structure as the generic ring oscillator, however such PUFs may use self-timed rings instead of the inverter chains. The design may be based on the use of the Muller's C-element, a fundamental building block of asynchronous circuits. A significant benefit of self-timed rings may be that they make resulting PUF more immune to environmental variations. However, there may be an increase in the used silicon surface area. Furthermore, these self-timed structures may be prone to entering deadlock states. Intrinsic PUFS may include glitch PUFS; this may also involve a delay based PUF construction which may be based on glitch behavior of combinatorial logic circuits. Occurrence of glitches may be determined by the difference in delay of the different logical paths from the input to output. As with other delay-based methods, the exact circuit delays may be subject to silicon manufacturing variations, and the number and shape of resulting glitches on output signals may be unique and be used as a PUF response.

Continuing to refer to FIG. 1, a PUF 120 may include a circuit producing a PUF via cross-coupled logical or analog circuit elements. As a non-limiting example, static random-access memory (SRAM) PUFs may be produced by cross-coupling two inverters and two access transistors. When the cell is powered up, the two cross-coupled inverters may enter a "power-struggle," where the winner is decided by the difference in the driving strength of the MOSFETs in the cross coupled inverters. Theoretically, there may be three possible states, where two are stable and one is metastable. If the transistors in the inverter circuits are perfectly matched, then the SRAM may remain metastable forever. Practically speaking, even though the transistors are designed to be identical, random variations in fabrication may ensure one has a stronger driving current, and this defines the initial start-up value for the cell. The majority of cells have an initial state that consistently may be returned to when powered up, and this is an important characteristic that allows them to be used for PUFs; a plurality of such cells may be used to generate a plurality of bits. Cross-coupling may be performed between other elements, such as without limitation a cell made up of two cross-coupled NOR gates (otherwise known as a latch); in operation, latch may be forced into an unstable state the resolution of which to either logic 1 or logic 0 may depend on slight mismatches between NOR gates. Similarly, a D flip-flop may be incorporated in a circuit that detects its power-up behavior. Alternatively or additionally, a PUF circuit may be fabricated by cross-coupling two transparent data latches, forming a bistable circuit. By leveraging the clear functionality of the latches, the circuit may be forced into an unstable state and converge when released to an output determined by slight manufacturing variations. Other examples of a PUF 120 in an embodiment include without limitation buskeeper PUFs, which may be similar to other PUFs based on bistable memory elements but leveraging buskeeper cells. A PUF 120 may also combine two or more PUF designs, for instance a bistable ring PUF, which may be a hybrid of a ring oscillator PUF and a SRAM PUF, wherein the structure is similar to the ring oscillator PUF, but the number of inverting elements is even. This may mean that the loop does not oscillate but is bistable (like the SRAM PUF). Using reset logic, the bistable ring may destabilize and subsequently stabilize into a state that is set by the random silicon manufacturing variations.

Continuing to view FIG. 1, a PUF 120 may include mixed-signal PUFs that produce a variable analog signal as determined by small circuit variations; analog signal may be converted to a digital signal using, for instance, an analog-to-digital converter, compared to a threshold voltage to produce a logic 1 or 0 output, or the like. PUFs may be constructed, as a non-limiting example, using threshold voltage PUFs: these may be constructed by connecting identically designed transistors in an addressable array may driving resistive loads; in operation, because of random silicon manufacturing variations, the transistor threshold voltages and current through the load may be random. Similarly, mixed-signal PUFs may include inverter gain PUFs, which may be based on the variable gain of equally designed inverters. The variable gain may be random because of random silicon process variations. Each challenge-response pair may be extracted from a pair of inverters. Mixed-signal PUFs may include super high information content (SHIC) PUFs, which may include an addressable array of diodes implemented as a crossbar memory forms the structure; each diode may be, as a non-limiting example, produced by a crystal-growing process that seeds and produces random variation in crystal growth within the diode, resulting in unpredictably irregular I(U) curves. Read-out time of each memory cell may be influenced by random silicon manufacturing variations and this forms a PUF response. Mixed-signal PUFs may include SRAM failure PUFs. Static noise margin for an individual SRAM cell may depend on random silicon manufacturing variations. As such, each SRAM cell may produce a bit failure at different noise levels, and this may be leveraged to generate a PUF response. In each case, the PUF circuit element producing the variable signal may be connected to an analog to digital converter, comparator, or similar element to produce one or more output bits.

In an embodiment, and still viewing FIG. 1, a PUF 120 may include a circuit implementing a quantum PUF. A quantum PUF, as used herein, is a PUF that generates secrets, such as random numbers, that are unique to the PUF owing to the nanostructure of atomic layers in an electronic or other component, so that the variations are governed by quantum physics, and harder to predict. Quantum PUF may include a quantum confinement PUF, which may operate by varying its output according to variations in behavior due to quantum confinement as determined by nanostructure of atomic layers of one or more components. In an embodiment, uniqueness of a quantum PUF or quantum confinement PUF may be made highly probable by the inherently random nature of atomic positions and imperfections in a quantum well. Simulating structures on such a scale may require computationally infeasible amounts of computing power, even for some quantum computers, particularly where multiple quantum PUF elements are used together; infeasibility may be enhanced by the unknown nature of the nanostructures, which may be impossible to determine without atom-by-atom dismantling.

Still referring to FIG. 1, implementation of quantum confinement PUFs may be achieved using any device that can measure phenomenological properties arising from behavior governed by quantum mechanics, such as without limitation properties governed by quantum confinement. Implementation may, as a non-limiting example for illustrative purposes, involve characterizing fluctuations in tunneling through quantum wells in resonant tunneling diodes (RTDs); an RTD may permit electrons to tunnel through it directly where voltage across the RTD places an energy level at a conduction band minimum. As confined energy level may be exponentially sensitive to width and height of a quantum well determined by atomic-level variations, such as variations atomic uniformity at interfaces between layers in RTD, this may cause the required voltage for tunneling to vary according to such variations in RTD, causing RTD behavior to be dictated by such variations. Such diodes may, in a non-limiting example, be constructed by fabricating from an InGaAs/AIAs double-barrier structure, formation of top and bottom ohmic contacts, and etching, which may be wet-etching, to isolate the resulting component from other structures on the die. Quantum confinement PUF may function, as a non-limiting example, through measuring electronic properties, for instance by determining current/voltage response of one or more RTDs, other types of diodes and/or combinations of various types of diodes (in any parallel or series arrangement) and analyzing the resultant curves for peak values, slopes, gradients, valleys, full-width-half-max, number of peaks, or other component identified by the current-voltage response that would serve as a uniquely identifying characteristic. Confined energy levels may be highly sensitive to the specific nanostructure within each RTD, leading to a distinct tunneling spectrum for every device. As a non-limiting example, measurement may be performed by finding currents corresponding to energy levels by sweeping voltage across each RTD through a range and recording the resulting currents. Multiple RTDs may be combined to increase output complexity, for instance by coupling together in series or by using a crossbar structure as for other diode based PUFs.

Continuing to refer to FIG. 1, as persons skilled in the art will be aware upon reviewing the entirety of this disclosure, variations may be applied to RTDs and/or manufacture of RTDs to increase a degree of variation in response from one RTD to another. For instance, RTDs may be selected and/or manufactured to have a double barrier rather than a single barrier, causing behavior to depend on four barrier interfaces rather than two barrier interfaces. Variations may include incorporation of a ternary material into quantum well. Variations may include manipulations of manufacturing steps to create uniqueness, such as without limitation inducing variations in molecular bean epitaxy growth, for instance by not rotating a sample stage during a particular step; this may introduce 1-monolayer variations at barriers, which may induce additional I-V characteristic variations. In an embodiment, such variations may also render the RTD-based PUF more tamper-resistant, as invasive probing of device would distort nanostructure and change the outputs; alternatively or additionally, a PUF manufactured in this way may be reconfigurable by, for instance, a controlled application of heat causing modifications to the nanostructure. Implementation variations may further include exploitation of changes in PUF response due to local variations in temperature and magnetic field; such changes would be unknown to an attacker and may enable the production of multiple unique IDs based on such fluctuations, in a manner unpredictable even to the manufacturer.

With continued reference to FIG. 1, other elements or components may be used instead of or additionally to RTDs to exploit variations in quantum-physical behavior based on nanoscale variations. Such elements or components may include, without limitation, three-dimensional nanostructures, such as quantum dots, which typically have many electron and hole confinement levels. RTDs or similar elements may be modified to contain single, or a few, dots, converting this increase in the number of confined states to an increased number of peaks in their dI/dV curves; each peak, when fitted individually and combined, could form part of a unique key for at least a secret generator 204*a-b*. A number of dots in a device such as an RTD does may not be reproducible or may be allowed to vary. There may be many constructions of quantum PUFs and/or quantum-confinement PUFs based on these principles as will be evident to those skilled in the art, upon reviewing the entirety of this disclosure, including without limitation use of alternative or additional structures or components incorporating two or three-dimensional features evincing electrical behavior that varies based on quantum-physical properties affected by nanoscale manufacturing variations.

Continuing to view FIG. 1, other applications of other types of PUFs, such as uniquely identifying a particular material good based on, for example, a unique pattern developed due to the details of how the part was manufactured, extruded, finish coating was sprayed, etc., either across the part or at one or more points on the part, may also be implemented or exploited. These details may include optical reflection/scattering at one or more of the material interfaces, the measurement of this optical response, and optionally the computation of a digital bit string uniquely identifying or representing the optical response.

With continued reference to FIG. 1, a PUF 120 may include, without limitation, PUFs implemented using design of vertical interconnect accesses (VIAS) in multi-layered chips or integrated circuits. A "VIA-PUT" may be created by, without limitation, designing VIAs with a small enough size that there is a roughly equal chance that they will or will not be created; this may cause the VIAs that function in the completed circuit to be randomly placed, leading to circuit behavior that is not predictable ahead of time. The above-mentioned randomness generated by random VIA creation may cause the resulting circuit to behave as a PUF. Such a VIA-PUF may be extremely robust over time and across environmental conditions.

Continuing to refer to FIG. 1, a PUF 120 may include one or more photonic PUFs. In an embodiment, a photonic PUF may take advantage of the fact that some photonic devices can operate in a non-linear and/or chaotic manner. In a non-limiting example, a photonic PUF is manufactured by creating a microcavity in a material, such as silicon; microcavity may be formed with a chamfer, Microcavity may be formed, as a non-limiting example with a diameter on the order of tens of micrometers; for instance, microcavity may have a 30-micrometer diameter in an exemplary embodiment. Chamfer size and position may be varied between microcavities; arbitrarily positioned holes may be formed in an interior surface of one or more microcavities to induce irregularities; further irregularities may be introduced as an inevitable result of limits on manufacturing consistency. Irregularities may create variable reflective and/or refractive responses to a pulse of fight, which may include, as a non-limiting example, a pulse in the femtosecond to atto-second range, such as, for illustrative purposes only, a 175-femtosecond pulse from a model-locked laser having a 90-MHz repetition rate, Fabrication may include incorporation of the light source. In operation, Optical output waveforms may also be complex and highly sensitive to precise physical cavity structure; at the same time responses may remain highly repeatable. Continuing the example, ultra-short optical pulses (e.g. in the femtosecond to attosecond region) may be used to probe microcavities; the pulses may excite a unique combination of spatial optical modes that may interact with fine-scale structure of cavity interiors and with one another through optical nonlinearity of silicon. Each sequence of optical responses may contain spatiotemporal features that are extremely sensitive to cavity structures. It may be possible to extract long binary keys, including keys on the order of gigabytes, from a single micro-cavity PUF. Alternative or additional non-linear photonic devices may be used to implement a photonic PUF.

Further viewing FIG. 1, other examples of a PUF 120 that may be used may include, without limitation, nano electro-mechanical (NEM) PUFs. NEM PUFs may include PUFs that leverage stiction of a silicon nanowire to a binary gate structure. In an embodiment, an NEM PUF system may be highly robust; as a non-limiting example, NEM PUF may work effectively across a wide range of environmental conditions, including without limitation thermal variation, exposure to microwave radiation, and exposure to high dose radiation at various frequencies. Additional methods for PUF implementation may include, without limitation Kirchoff-law-Johnson-noise (MAN) PUFs, which may use KLAN key exchange to generate, between two hardware components, a new and manufacturer-unknown secret key which may be stored locally in, for instance, secure hash memory. In an embodiment, one or more bits may be output directly from a PUF 120 and/or a TPM 116; such outputs may be used to generate symmetric or asymmetric keys, private keys, secure proofs, or other proofs of authenticity, as described in further detail below.

Still referring to FIG. 1, a secure computing module 112 may include at least a Secure Processor 124. Secure Processor 124 may include a processor as described below in reference to FIG. 5. Secure Processor 124 may operate autonomously from other processors and/or an operating system operating on at least a cryptographic evaluator; for instance, secure processor 124 may store entries in temporary or long-term memory in encrypted form, where decryption is impossible without private keys not available to devices, circuits or software besides secure processor 124. Encryption may likewise be impossible without private keys available only to secure processor 124. Secure processor 124 may also digitally sign memory entries using, for instance, a private key available only to secure processor 128. Keys available only to secure processor 124 may include keys directly encoded in hardware of secure processor 124; i.e., a process to digitally sign and/or encrypt using keys may be coded using logic circuits, field-programmable arrays, read-only memory, burning into memory using one-time programmable polysilicon fuses, or the like, and thus be immutable absent physical changes to secure processor 124. Secure processor 124 may be constructed, similarly to a TPM 116, to frustrate alteration and/or probing to discover and/or alter private keys. Private keys may be demonstrable as uniquely associated with secure processor 124 by use of a PUF 120 as described above; secure processor may include, for instance, a TPM 116 as described above. Alternatively or additionally, a certificate authority as described above, which may be a manufacturer of secure processor, may verify that one or more public keys are associated uniquely with secure processor according to any protocol suitable for digital certificates.

Still referring to FIG. 1, examples of a secure computing modules 112 may include, without limitation, TPM 116 as described above. The secure computing module 112 may include TPM 116 combined with a boot-measuring protocol using hash trees, Merkle trees, or the like to measure boot entries to create an "attested boot." A secure computing module 112 may include a trusted execution technology (TXT) module combining a TPM 116 with establishment of a secure container at run-time; secure container may be isolated from a software stack and OS of at least the process authentication node 104 and/or use TPM 116 to measure and attest to secure container prior to launch. Secure computing module 112 may implement a trusted enclave, also known as a trusted execution environment (TEE). In an embodiment, a trusted enclave may be a portion of a computing device that is isolated from the main processor of the computing device. Isolation may be achieved using elements of secure computing module 112 as described above, including isolation of memory. Isolation of memory may be achieved through any process or architecture as described above for secure memory, including encryption using a cryptographic system a decryption and/or encryption key to which a secure processor or TPM has access, but to which a CPU or other main processor, as well as input/output devices or connections, does not and/or use of dedicated cache lines or the like to physically separate memory accessible to secure computing module 112 from CPU and/or input/output devices or connections. Inputs and outputs to and from trusted enclave may be restricted and controlled tightly by a secure processor and/or TPM as described above. Trusted enclave may perform trusted and/or attested computing protocols as described above, including without limitation attested boot protocols. Examples of trusted enclaves include without limitation those enabled by SOFTWARE GUARD EXTENSIONS (SGX) systems as promulgated by Intel Corporation of Santa Clara, Calif. RISC V architecture, including without limitation sanctum processors, ascend secure infrastructure, Ghostrider secure infrastructure, ARM TrustZone, Trusted Little Kernel (TLK) as promulgated by Nvidia Corporation of Santa Clara, Calif., and Secure Encrypted Virtualization (SEV) as promulgated by Advanced Micro Devices, Inc. of Santa Clara, Calif. Persons skilled in the art, upon reviewing the entirety of this disclosure, will be aware of various additional or alternative trusted computing processes that may be used to implement secure computing module 112, TEE, or trusted enclaves as disclosed herein. System 100 may incorporate or communicate with a certificate authority.

Further referring to FIG. 1, any computing device described in this disclosure may be configured to generate digital signatures. A digital signature as used herein is an application of a secure proof of a secret possessed by a particular device and/or user thereof to an element or lot of data, or to a verifiable mathematical representation of the element or lot of data, which may include a cryptographic hash as described above. A secure proof, as used herein, is a protocol whereby an output is generated that demonstrates possession of a secret, such as module-specific secret, without demonstrating the entirety of the module-specific secret; in other words, a secure proof by itself, is insufficient to reconstruct the entire module-specific secret, enabling the production of at least another secure proof using at least a module-specific secret. Where at least a module-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a module-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multiparty computation (MPC) proof. Zero-knowledge proof may include, without limitation, an incrementally verifiable computation (IVC). Zero-knowledge proof may include an interactive oracle proof (TOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a module-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A digital signature may include, without limitation, an encrypted mathematical representation of a file or other set of data using the private key of a public key cryptographic system. Signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if mathematical representation of file is well-designed and implemented correctly, any alteration of the file will result in a mismatch with the digital signature; the mathematical representation may be produced using an alteration-sensitive, reliably reproducible algorithm, such as a hashing algorithm as described in further detail below. A mathematical representation to which the signature may be compared may be included with signature, for verification purposes; in other embodiments, the algorithm used to produce the mathematical representation is publicly available, permitting the easy reproduction of the mathematical representation corresponding to any file.

In an embodiment, a digital signature may have a property of unlinkability; that is, digital signature may be delegated from one device to another in a way that makes digital signature impossible or practically infeasible to use for deduction of a granting device or of a digital signature that was previously used to derive and/or generate digital signature. In an embodiment, and without limitation, this may be accomplished as described in Nonprovisional application Ser. No. 16/682,809, filed on Nov. 13, 2019, and entitled "METHODS AND SYSTEMS FOR IMPLEMENTING AN ANONYMIZED ATTESTATION CHAIN," the entirety of which is incorporated herein by reference.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a remote device as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing hardware apparatus as described in further detail below; in such scenarios, authentication may include proof by the secure computing hardware apparatus that the secure computing hardware apparatus possesses a secret key to a public key/certificate pair.

In some embodiments, persons, devices, or transfers may be authenticated or assigned a confidence level using digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a remote device as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing module 112 as described in further detail below; in such scenarios, authentication may include proof by the secure computing module 112 that the secure computing module 112 possesses a secret key to a public key/certificate pair. Although digital signatures have been introduced here as performed using public key cryptographic systems, digital signatures may alternatively or additionally be performed using any non-interactive zero-knowledge proof; for instance, a proof may be recorded in conjunction with a datum, and a verification may be performed by any party seeking to evaluate the proof.

Certificate authority may be implemented in a number of ways, including without limitation as described in U.S. Nonprovisional application Ser. No. 16/680,787, filed on Nov. 12, 2019, and entitled "METHODS AND SYSTEMS FOR A DISTRIBUTED CERTIFICATE AUTHORITY," the entirety of which is incorporated herein by reference; for instance, and without limitation, certificate authority may include, be included in, and/or be implemented as a distributed certificate authority as described in Non-provisional application Ser. No. 16/680,787.

Still referring to FIG. 1, digital signatures may be generated using a secure computing module 112. A single key may be used in one or more digital signatures, such as signatures used to receive and/or transfer possession of crypto-currency assets; the key may be discarded for future use after a set period of time. In an embodiment, varied inputs including variations in local physical parameters, such as fluctuations in local electromagnetic fields, radiation, temperature, and the like may be combined with key-generation circuits or methods, such that an almost limitless variety of private keys may be so generated. In an embodiment, at least a remote device and/or secure computing module 112 may convert immediate output from PUP' 120 into key in the form of a binary number. This may be performed, without limitation, using a fuzzy extractor, such as those used to convert slightly variable signals from biometric samples or the like predictably into keys by having certain variation tolerances in the binary encoding process. Private key extraction may utilize additional corrective measures, including as a nonlimiting example machine learning, neural networks, convolutional neural networks and the like, or other approaches to provide error correction over the operating temperature range of the device, to ensure consistency in key extraction. Private key generation may alternatively or additionally incorporate true random number generator(s) (TRNGs), pseudorandom number generators (PRNGs) and related devices. Extraction may include extraction of a symmetric key; for instance, at least a remote device and/or secure computing module 112 may extract one or more random numbers based on a PUF 120 output to create a symmetric key as described above. Alternatively or additionally, extraction may include extraction of a private key of a public key cryptographic system.

Still referring to FIG. 1, key extraction may include use of a number output by a PUF 120 or other circuit to generate a public and private key pair. For instance, such a number output may be used as a seed in an elliptic curve cryptographic system. In a non-limiting example, output may include a random number generated within a desired interval, which may be achieved, for instance, by setting the number of output bits to be provided from a PUF 120; steps along a chosen elliptic curve may then be performed using random number to generate a public key. Initial point on elliptic curve and elliptic curve may be selected using an additional random numbers, which may be generated using any suitable method; random numbers associated with curves having known vulnerabilities may be discarded, according to mathematical descriptors or other characteristics of such vulnerabilities as stored in memory of or accessible to at least a remote device and/or secure computing module 112. Persons skilled in the art, upon reading the entirety of this disclosure, will be aware of various ways in which a random number may be used to generate a private and public key pair consistently with this disclosure.

Still viewing FIG. 1, Key extraction may utilize a numerical output from a PUT 120 or other element of secure computing; module 112 to generate an RSA private key; this may be accomplished, for instance, by using numerical outputs to generate RSA primes. RSA primes may be generated, as a general matter, by obtaining a random or pseudorandom odd number, checking whether that number is prime, and if it is not, repeatedly incrementing by 2, or some other amount leading to additional odd numbers, and rechecking until a prime is discovered. PUF 120 and/or elements of secure computing module 112 may generate one or more random numbers, for instance by using one or more PUFs as described above; any suitable algorithm may be used for generating a prime from a random number to produce pairs of primes usable as RSA factors, Random numbers below a threshold size may be discarded, and other filtering processes may be employed to discard potentially insecure prime factors. Persons skilled in the art, upon reviewing the entirety of this disclosure, will be aware of many suitable methods for creating RSA primes, and using such primes to generate RSA keys, using random numbers output by PUFs or other elements. Keys may be used to generate exponents for a cryptographic system such as Diffie-Helman or ElGamal that are based on the discrete logarithm problem.

Continuing to view FIG. 1, digital signature may be generated using a digital signature using a direct anonymous authentication protocol (DAA). In an embodiment, DAA is an anonymous digital signature scheme, which instead of reliance on a certificate authority to link a particular private key to a particular party, uses reference to a group public key or to multiple public keys to verify an anonymous signature. Secure computing module 112 may act as a "first signer" of a digital signature, signing with a private key produced from a secret generator as described above. In an embodiment secure computing module 112 signs an element of data using the private key. A second signer, which may be secure computing module 112 and/or an additional element coupled thereto, may previously or subsequently sign the element of data or another element linked to the element previously signed; alternatively or additionally, second signer may use information or signature elements provided by secure computing module 112 to perform a digital signature. This process may, for instance, enable generation of novel secret keys using additional circuitry, to demonstrate, for instance, timeliness of execution and frustrate delay-based attacks. DAA may perform digital signature using a zero-knowledge proof; for instance, any non-interactive zero-knowledge proof and/or zero-knowledge proof that may be made non-interactive may be used to generate digital signature, where signature may be, for instance, the proof algorithm output, while verification program, trusted setups where needed, or the like may be publicly available for evaluation of digital signature, i.e. of the proof.

With continued reference to FIG. 1, secure computing module 112 may implement one or more methods of attested computation. Attested computation may include or involve one or more methods to ensure that computation of a program, known as an attested program, is trusted and signed by secure computing module 112 and/or computing device incorporating secure computing module 112; this may be supported by means to assert the state of the system memory, code, input data and/or output data. In an embodiment, attested computing may include or involve one or more methods to authenticate a boot loader. An authenticated boot loader may include a first code that the secure computing module 112 may run upon system initialization and is responsible for checking the measurements and/or signatures of subsequent components either locally or by utilizing a piece of trusted hardware such as a TPM 116. Authenticated boot loaders may differ in practice by how they obtain their attestation root key, whether a root of trust for measurement/verification differs from the root of trust for attestation, and whether components are verified using a signature, in non-limiting examples, but are considered for purposes of this description secure or authenticated boot loaders. Attested computation may further rely upon secure microcode and/or a trusted software component, and/or secure signing enclaves, which are constructions that protect memory access from operating system level operations. Attested computation may rely upon wholly or in part on a measurement root, which computes a cryptographic hash of a trusted software component, and/or may generate a trusted software component attestation key pair and certificate based on the trusted software component's hash. In a representative embodiment, measurement root may read the processor key derivation secret and derive a symmetric or asymmetric key pair key based upon the trusted software component's hash. In an embodiment the measured root may utilize at least a processor key derivation secret to derive a symmetric or asymmetric key pair for decrypting a trusted software component and may include subsequent evaluation of the trusted software component. In an embodiment, the trusted software component may contain a header that contains the location of the attestation existence flag. In an embodiment, the measurement root may produce an attestation certificate by signing the trusted software component's private attestation key. The measurement root may generate a symmetric key or other cryptographic key for the trusted software component so it may encrypt its private attestation key and store it in untrusted memory. Attestation may be used to attest any computing process and/or datum, including without limitation sensor readout, attested time, attested geographical data such as without limitation global positioning system (GPS) data, and the like.

In an embodiment, secure computing module 112 and/or a computing device incorporating secure computing module 112 computes a cryptographic hash of a system state when performing a trusted computation. System state may include, without limitation, program code and/or one or more elements of data being computed. A resulting cryptographic hash of system state may be stored in one or more trusted or secured memories as described above. Secure computing module 112 and/or computing device incorporating secure computing module 112 may append a cryptographic signature based upon any private key that may be associated with secure computing module 112 as described herein. Secure computing module 112 and/or computing device incorporating secure computing module 112 may operate a security reset of working memory prior to load of data for trusted computation; for instance, the secure computing module 112 and/or computing device incorporating secure computing module 112 may append a hash of the memory to cryptographic hash of system state following reset and prior to loading data. Secure computing module 112 and/or computing device incorporating secure computing module 112 may append its authentication signature of memory page tables and/or memory tables. Upon completion of the trusted computation, which may include execution of program code of system state, secure computing module 112 and/or computing device incorporating secure computing module 112 may append an output value of the trusted computation to cryptographic hash of system state. In an embodiment, an output value of the trusted computation may itself be cryptographically hashed and/or encrypted; encryption may be performed using any form of hardware or software-based encryption that may be associated with secure computing module 112. Secure computing module 112 and/or computing device incorporating secure computing module 112 may include a system to compute one or more hash trees of cryptographic hash of the computation, system state, and/or outputs; secure computing module 112 and/or computing device incorporating secure computing module 112 may store the one or more hash trees within the trusted computation boundary. Hash trees may be appended to the trusted computation hash. Any process steps or components described above as performing trusted and/or attested computing may be performed or omitted in any order or combination as will be apparent to those skilled in the art, upon reading the entirety of this disclosure; for instance, order of appending data may be done in any combination.

With continued reference to FIG. 1, process authentication node 104 may be configured to interact with digitally signed assertions in a secure listing 128; the secure listing 128 may be utilized to record any set of data generated by elements or computing devices of system 100 in an inalterable format that permits authentication of such entry and may serve as a form of memory storage. Secure listing 128 may be accessible at any of various security settings; for instance, and without limitation, the secure listing 128 may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. Secure listing 128 may, for instance be encrypted, and decryption keys may be distributed only to devices authorized to participate in authentication as described herein. In an embodiment, decryption key may be stored by process authentication nodes as described in further detail below. Exemplary embodiments of secure listing, which may include embodiments of secure listing 128, are described in more detail below in FIG. 2.

Continuing to look at FIG. 1 secure listing 128 may be implemented by a plurality of process authentication nodes. In an embodiment, a plurality of process authentication nodes implementing secure listing 128 may allow for multiple asset transfers to occur simultaneously. In an embodiment, an asset transfer at a first process authentication node may occur while at the same time a second asset transfer may occur at a second process authentication node. In an embodiment, a plurality of process authentication nodes provide additional levels of security by having additional verifications of accounts. In an embodiment, having a plurality of process authentication nodes implementing secure listing 128 may also allow for simultaneous updates from an institution and allow an institution to generate an approval for more than one process authentication node.

With continued reference to FIG. 1, process authentication node 104 may extract data used in methods or method steps as described below for performing an asset transfer via a data extractor 136. A data extractor 136 may read data from either the transferor or transferee. A data extractor 136 may include a debit card reader or credit card reader that reads data from a physical credit or debit card. This may involve the use of a magnetic card reader that is used to read magnetic stripe cards such as those found on physical credit and/or debit cards. A data extractor may also extract data through a digital chip reader that is used to read digital payment methods found in a digital wallet. A digital chip found on a digital debit or credit card or other payment method in a digital wallet may have secure encrypted features such as the secure computing module 112, the TPM 116, the PUF 120, and/or the secure processor 124. A data extractor 136 may be directly connected to the process authentication node 104 and may even be found physically at the process authentication node 104 and/or on the same device. In yet another embodiment, a data extractor 136 may be located peripherally, and not physically next to or on top of the process authentication node 104.

Further referring to FIG. 1, a "secure listing," as used in this disclosure, is a data structure including digitally signed assertions, credentials, and/or authentication tokens, where "including" an element of data signifies containing the element itself and/or a representation thereof such as a cryptographic hash, Merkle root, or the like, such that inclusion or "membership" in the secure listing can be proven. Membership in the secure listing may be revoked, in non-limiting example a secure listing may define the set of non-revoked members within a given temporal epoch. In non-limiting example, Membership may be proven by demonstrating that a member is not on a revocation list by means of secure proof or any method known to those skilled in the art. A secure listing may include a cryptographic accumulator. A "cryptographic accumulator," as used in this disclosure, is a data structure created by relating a commitment, which may be smaller amount of data that may be referred to as an "accumulator" and/or "root," to a set of elements, which may include without limitation textual elements, authentication tokens, digitally signed assertions, and/or credentials, together with membership and/or nonmembership proofs for any element in the set. In an embodiment, these proofs may be publicly verifiable against the commitment. A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. For instance, a cryptographic accumulator may be implemented as a Merkle tree and/or hash tree, in which each accumulated element created by cryptographically hashing a lot of data. Two or more accumulated elements may be hashed together in a further cryptographic hashing process to produce a node element; a plurality of node elements may be hashed together to form parent nodes, and ultimately a set of nodes may be combined and cryptographically hashed to form root. Contents of root may thus be determined by contents of nodes used to generate root, and consequently by contents of accumulated elements, which are determined by contents of lots used to generate accumulated elements. As a result of collision resistance and avalanche effects of hashing algorithms, any change in any lot, accumulated element, and/or node is virtually certain to cause a change in root; thus, it may be computationally infeasible to modify any element of Merkle and/or hash tree without the modification being detectable as generating a different root. In an embodiment, any accumulated element and/or all intervening between accumulated element and root 308 may be made available without revealing anything about a lot of data used to generate accumulated element.

Continuing to refer to FIG. 1, a secure listing may include a zero-knowledge set. A "zero-knowledge set," as defined in this disclosure, is a set of elements of textual data such as strings, to which a prover may commit such that after commitment the prover can prove, for any textual datum, whether the textual datum is or is not in the set without revealing any knowledge about the set and/or any element thereof beyond the verity of such membership assertions.

Continuing to refer to FIG. 1, a secure listing may include a range proof, defined for purposes of this disclosure as a set-membership proof with respect to a set that is a sequence of values on a range between upper and lower bounds, such as an open or closed set on the real number line or the like.

Still referring to FIG. 1, a secure listing may include a temporally sequential listing, which may include any set of data used to record a series of at least a digitally signed assertion in an inalterable format that permits authentication of such at least a digitally signed assertion. In some embodiments, secure listing records a series of at least a digitally signed assertion in a way that preserves the order in which the at least a digitally signed assertion took place. Secure listing may be accessible at any of various security settings; for instance, and without limitation, secure listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping.

Figure 2:
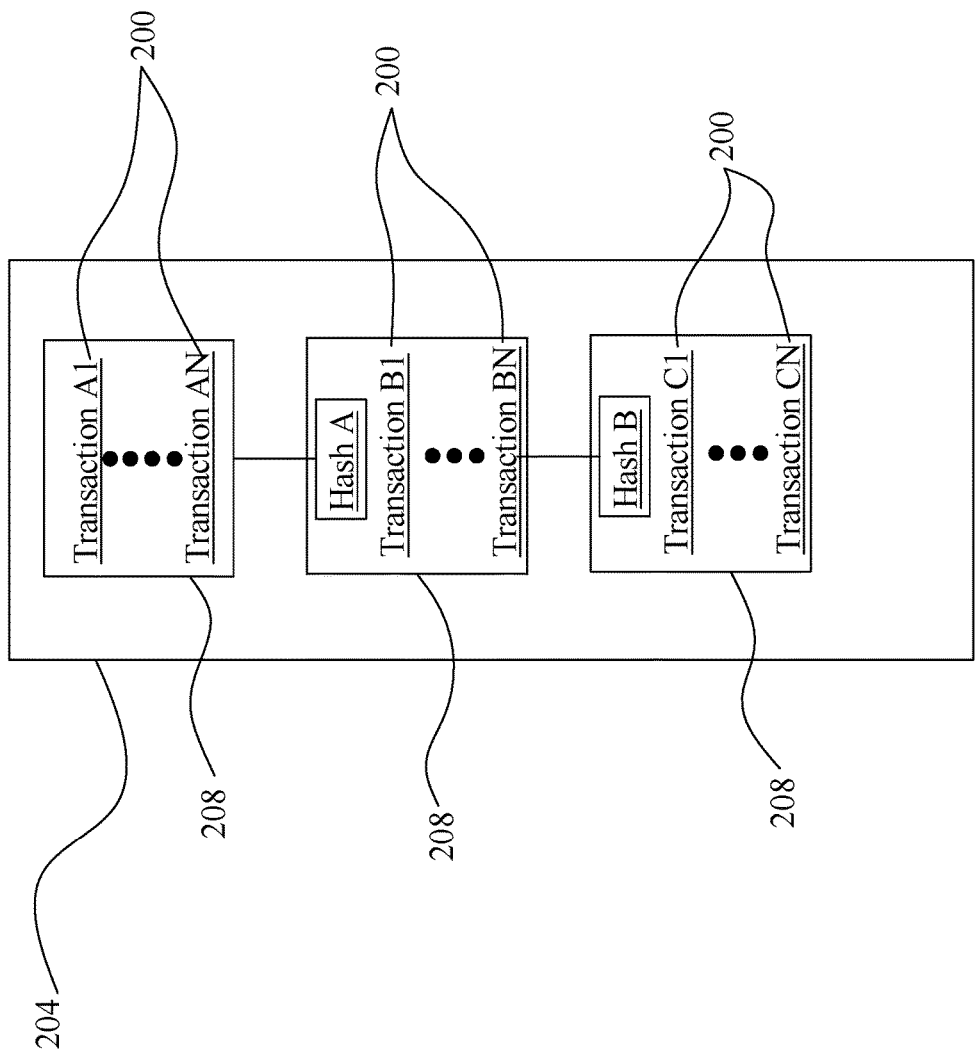
FIG. 2 is a block diagram illustrating an exemplary embodiment of a temporally sequential listing of digitally signed assertions.

Referring now to FIG. 2, a secure listing may be used to store, maintain, and/or authenticate a digitally signed assertion 200. In an embodiment, at least a digitally signed assertion 200 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 200. In an embodiment, collection of textual data states that the owner of a certain transferable item of value represented in the at least a digitally signed assertion 200 register is transferring that item to the owner of an address. At least a digitally signed assertion 200 may be signed by a digital signature created using the private key associated with the owner's public key, as described above. For instance, at least a digitally signed assertion 200 may describe a transfer of virtual currency, such as crypto currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. At least a digitally signed assertion 200 may describe the transfer of a physical good; for instance, at least a digitally signed assertion 200 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with the at least a digitally signed assertion 200 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in an embodiment, an address is a textual datum identifying the recipient of virtual currency or another item of value in at least a digitally signed assertion 200. Address may be linked to a public key, the corresponding private key of which is owned by the recipient of the at least a digitally signed assertion 200. For instance, address may be the public key. Address may be a representation, such as a hash, of the public key. Address may be linked to the public key in memory of a computing device, for instance via a "wallet shortener" protocol. Where address is linked to a public key, a transferee in at least a digitally signed assertion 200 may record a subsequent at least a digitally signed assertion 200 transferring some or all of the value transferred in the first at least a digitally signed assertion 200 to a new address in the same manner. At least a digitally signed assertion 200 may contain textual information that is not a transfer of some item of value in addition to, or as an alternative to, such a transfer. For instance, as described in further detail below, at least a digitally signed assertion 200 may indicate a confidence level associated with a cryptographic evaluator as described in further detail below.

With continued reference to FIG. 2, at least a digitally signed assertion 200 may be included in a secure listing, which may include any secure listing as described above. In a non-limiting embodiment, secure listing may include a temporally sequential listing 204. Temporally sequential listing 204 may include any set of data used to record a series of at least a digitally signed assertion 200 in an inalterable format that permits authentication of such at least a digitally signed assertion 200. In some embodiments, temporally sequential listing 204 records a series of digitally signed assertions of at least a digitally signed assertion 200 in a way that preserves the order in which the at least a digitally signed assertion 200 took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping.

Still referring to FIG. 2, temporally sequential listing 204 may preserve the order in which the at least a digitally signed assertion 200 took place by listing them in chronological order; alternatively or additionally, temporally sequential listing 204 may organize digitally signed assertions 200 into sub-listings 208 such as "blocks" in a block-chain, which may be themselves collected in a temporally sequential order; digitally signed assertions 200 within a sub-listing 208 may or may not be temporally sequential. Temporally sequential listing 204 may preserve the order in which at least a digitally signed assertion 200 took place by listing them in sub-listings 208 and placing the sub-listings 208 in chronological order. The temporally sequential listing 204 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus, or Hyperledger, Hyperledger Sawtooth or the like. In an embodiment, temporally sequential listing 204 may be a secured ledger; in one embodiment, a secured ledger is a ledger having safeguards against alteration by unauthorized parties. Temporally sequential listing 204 may be maintained by a proprietor, such as a system administrator on a server, that controls access to the ledger; for instance, the user account controls may allow contributors to the ledger to add at least a digitally signed assertion 200 to the ledger but may not allow any users to alter at least a digitally signed assertion 200 that have been added to the ledger. In an embodiment, temporally sequential listing 204 may be cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Temporally sequential listing 204 may be incorporated in, stored in, or incorporate, any suitable data structure, including without limitation any database, datastore, file structure, distributed hash table, or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, trusted time ordering is provided by a group of entities collectively acting as the time stamping authority with a requirement that a threshold number of the group of authorities sign the timestamp.

In some embodiments, and with continued reference to FIG. 2, temporally sequential listing 204, once formed, cannot be altered by any party, no matter what access rights that party possesses. For instance, temporally sequential listing 204 may include a hash chain, in which data is added during a successive hashing process to ensure non-repudiation. Temporally sequential listing 204 may include a block chain. In one embodiment, a block chain is temporally sequential listing 204 that records one or more new at least a digitally signed assertion 200 in a data item known as a sub-listing 208 or "block." An example of a block chain is the BITCOIN block chain used to record BITCOIN transactions and values. Sub-listings 208 may be created in a way that places the sub-listings 208 in chronological order and links each sub-listing 208 to a previous sub-listing 208 in the chronological order, so that any computing device may traverse the sub-listings 208 in reverse chronological order to verify any at least a digitally signed assertion 200 listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the temporally sequential listing 204 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure. Alternatively, creation of new sublisting 208 may be performed according to proof of elapsed time or other random beacon-based assignment mechanisms, by proof of authority, or the like.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be crypto currency as defined below. Incentive may be redeemed for particular products or services; the incentive may be a gift certificate with a particular business, for instance. Incentive may be sufficiently attractive to cause participants to compete for the incentive by trying to race each other to the creation of sub-listings 208 Each sub-listing 208 created in temporally sequential listing 204 may contain a record or at least a digitally signed assertion 200 describing one or more addresses that receive an incentive, such as virtual currency, as the result of successfully mining the sub-listing 208.

With continued reference to FIG. 2, where two entities simultaneously create new sub-listings 208, temporally sequential listing 204 may develop a fork; protocol may determine which of the two alternate branches in the fork is the valid new portion of the temporally sequential listing 204 by evaluating, after a certain amount of time has passed, which branch is longer. "Length" may be measured according to the number of sub-listings 208 in the branch. Length may be measured according to the total computational cost of producing the branch. Protocol may treat only at least a digitally signed assertion 200 contained the valid branch as valid at least a digitally signed assertion 200. When a branch is found invalid according to this protocol, at least a digitally signed assertion 200 registered in that branch may be recreated in a new sub-listing 208 in the valid branch; the protocol may reject "double spending" at least a digitally signed assertion 200 that transfer the same virtual currency that another at least a digitally signed assertion 200 in the valid branch has already transferred. As a result, in some embodiments the creation of fraudulent at least a digitally signed assertion 200 requires the creation of a longer temporally sequential listing 204 branch by the entity attempting the fraudulent at least a digitally signed assertion 200 than the branch being produced by the rest of the participants; as long as the entity creating the fraudulent at least a digitally signed assertion 200 is likely the only one with the incentive to create the branch containing the fraudulent at least a digitally signed assertion 200, the computational cost of the creation of that branch may be practically infeasible, guaranteeing the validity of all at least a digitally signed assertion 200 in the temporally sequential listing 204.

Still referring to FIG. 2, additional data linked to at least a digitally signed assertion 200 may be incorporated in sub-listings 208 in the temporally sequential listing 204; for instance, data may be incorporated in one or more fields recognized by block chain protocols that permit a person or computer forming a at least a digitally signed assertion 200 to insert additional data in the temporally sequential listing 204. In some embodiments, additional data is incorporated in an unspendable at least a digitally signed assertion 200 field. For instance, the data may be incorporated in an OP RETURN within the BITCOIN block chain. Additional data may be incorporated in one signature of a multi-signature at least a digitally signed assertion 200. In an embodiment, a multi-signature at least a digitally signed assertion 200 is at least a digitally signed assertion 200 to two or more addresses. In an embodiment, two or more addresses may be hashed together to form a single address, which is signed in digital signature of at least a digitally signed assertion 200. Two or more addresses may be concatenated. Two or more addresses may be combined by a more complicated process, such as the creation of a Merkle tree or the like. One or more addresses incorporated in the multi-signature at least a digitally signed assertion 200 may include typical crypto-currency addresses, such as addresses linked to public keys as described above, while one or more additional addresses in the multi-signature at least a digitally signed assertion 200 may contain additional data related to the at least a digitally signed assertion 200; for instance, the additional data may indicate the purpose of the at least a digitally signed assertion 200, aside from an exchange of virtual currency, such as the item for which the virtual currency was exchanged. Additional information may include network statistics for a given node of network, such as a cryptographic evaluator, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the cryptographic evaluator) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. This additional information may be encoded directly, via a hash, hash tree or other encoding.

With continued reference to FIG. 2, virtual currency may be traded as a crypto currency. In one embodiment, a crypto currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto currency to the miners. Quantities of crypto currency may be exchanged using at least a digitally signed assertion 200 as described above.

Still referring to FIG. 2, at least a digitally signed assertion 200 may be included data structures or memory elements besides a temporally sequential file, including without limitation any temporary or persistent memory as used in or by any computing device as described below in reference to FIG. 4. For example, and without limitation, at least a digitally signed assertion 200 may include one or more encrypted or otherwise secured or partitioned memory entries as entered for instance using a secure computing module 112 or according to a secure computing protocol as described in further detail below.

Referring again to FIG. 1, in some embodiments, secure computing module 112 and/or cryptographic evaluator may integrate a precision clock reference for determination of locations and latencies of nodes in the network graph. In non-limiting example, the precision clock reference may be a cesium- or rubidium-based atomic clock, active hydrogen maser, GPS disciplined oscillator, precision crystal oscillator, SAW oscillator, quartz oscillator or related that provides microsecond or better timing accuracy. In some embodiments, precision time may be used to establish physical distance by inference from latency statistics of nodes in the network, whether using probabilistic, Bayesian or other statistical methods, machine learning classifiers or other. In some embodiments, changes in inferred physical distance or latency between nodes in the graph may be used to flag potentially compromised secure computing modules 112, man in the middle or other attacks.

Figure 3:
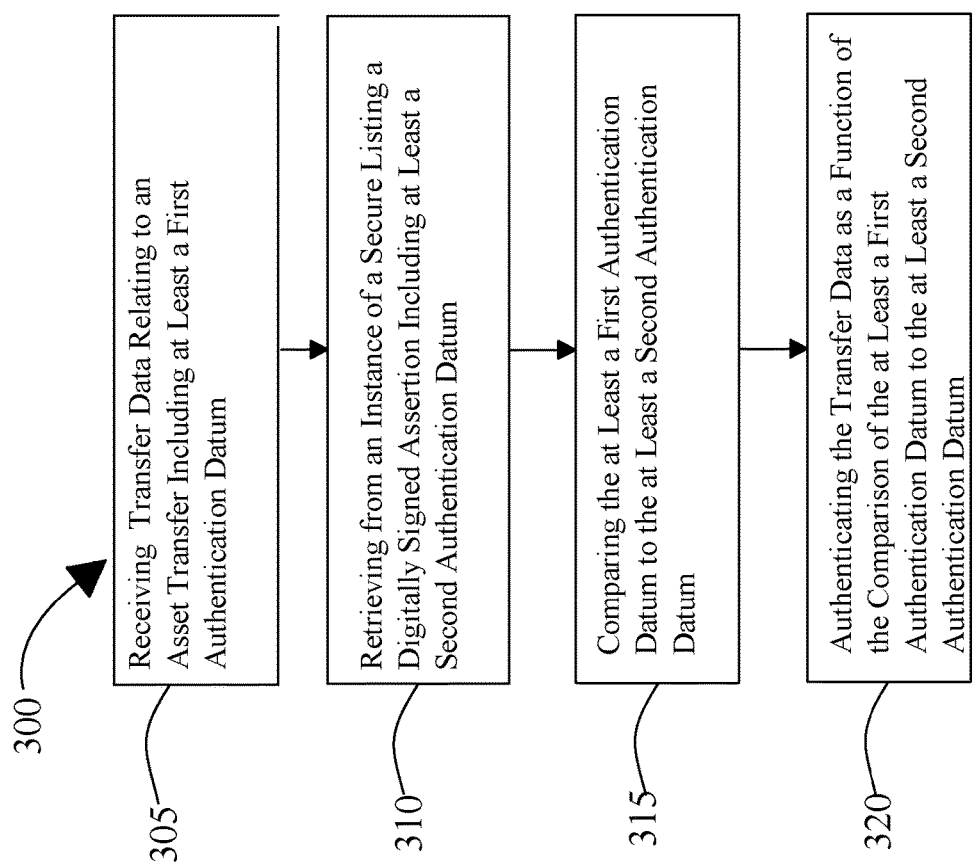
FIG. 3 illustrates particular implementations of various steps of a method for performing efficient cryptographic third-party authentication for asset transfers.

Referring now to FIG. 3, an exemplary embodiment of a method 300 of efficient third-party authentication of asset transfers is illustrated. At step 305, process authentication node 104 receives transfer data relating to an asset transfer; the transfer data includes at least a first authentication datum. An "authentication datum," as used herein, is one or more elements of data usable to identify a user and/or entity such as first party, to authenticate an identity thereof, and/or to establish authorization to perform a process as described in this disclosure. Authentication datum may include, without limitation, any authorization token as described in U.S. Nonprovisional application Ser. No. 16/680,787. At least a first authentication datum may include an identifier of the first party or transferor, defined as a party who will be transferring an asset to second party or transferee, defined as a party who will be receiving an asset. Transferor and/or transferee may be an individual, an entity, corporation, merchant, or the like. Identifier may include transferor's identification information such as name, and address, or may include transferor's issuing bank number, personal identification number (PIN), date of birth, postal code, transferor's account number, and similar information pertaining to transferee. In addition, an identifier may include credit card network information such as VISA, MasterCard, Discover, and American Express if a credit and/or debit card is being used for the transfer.

Still referring to FIG. 3, in yet another embodiment, at least a first authentication datum may include a stored value in a temporally sequential listing or other data structure such as a digitally signed assertion and/or secure proof received from transferor. These and other authentication datums will be described in more detail below.

Still referring to FIG. 3, in an embodiment, process authentication node 104 may extract transfer data and/or at least a first authentication datum using a data extractor 136. Extraction may include extraction of at least an element of transfer data from transferor's method of payment such as a credit card, debit card, digital wallet, or the like. Data extractor 136 may act as a tool used in conjunction with process authentication node 104. In such an example, data extractor 136, working as a peripheral device, may be connected to process authentication node 104 directly or over a network connection. In an embodiment, where data extractor 136 is directly connected, data extractor 136 may be physically attached to process authentication node 104. In yet another non-limiting example, data extractor 136 may be connected indirectly, possibly by a network connection.

Still referring to FIG. 3, data extractor 136 may extract at least a first authentication datum relating to an asset transfer. Data extractor 136 may extract data pertaining to an asset transfer by magnetic stripe technology, chip reader technology, and/or user entry of authentication datum. In an embodiment, data extractor 136 may consist of a device used to read information from magnetic swipe cards. Devices used to read magnetic strip cards may include basic skimmers, magnetic swipe card encoders, repackaged skimmers such as ATM fronts and slot adaptors such as cameras. In an embodiment, data extractor 136 may also consist of an EMV (Europay, Mastercard, and Visa) chip, which creates a token unique to the specific transfer taking place. In an embodiment, EMV chip readers may involve chip and signature verification and/or chip and PIN identification. In an embodiment, data extractor 136 may also involve user entry of identifying information pertaining to an asset transfer. In an embodiment, user may perform a digital asset transfer, and may input verifying information such as account numbers and credit card numbers online. In such an embodiment, user may work in conjunction with data extractor 136 to self-provide authentication datum.

Still referring to FIG. 3, in an embodiment, process authentication node 104 may receive at least a first authentication datum consisting of validation data associated with the transferor. Validation data, as used herein, may be any data used to aid in the verification of transferor. Validation data may include cardholder identification information such as transferor name and/or identity, transferor banking information, transferor bank account numbers, and/or account balance information Validation data may include, without limitation, a verification datum used to verify any secure proof as described in further detail below, including without limitation a public key associated with a private key used to perform a digital signature.

With continued reference to FIG. 3, transfer data may include a secure proof to be used relating to an asset transfer as an authentication datum; secure proof may be implemented, without limitation, as described above in reference to FIGS. 1-2.

Continuing to refer to FIG. 3, generation of a secure proof may further include generation of a verification datum. A verification datum is a datum used in a verification process by a device that is determining validity of a secure proof. As a non-limiting example, where a secure proof is a digital signature performed using a private key of a public key cryptographic system, a verification datum may be a corresponding public key, which may be used to decrypt the digital signature and verify that it was signed using the private key. Similarly, each zero-knowledge proof protocol may have a corresponding verification protocol whereby verification datum is used to validate the zero-knowledge proof.

Still referring to FIG. 3, at least a first authentication datum and/or transfer data may include transfer details. Transfer details may include total asset transfer amount and/or third-party ID. In an embodiment, at least the first process authentication node may receive information pertaining to the asset transfer including the total asset transfer amount or payment amount that is being exchanged between transferor and transferee. Further information may include a third-partly identifier, such as the name of the bank or merchant who may serve to broker the asset transfer between transferor and transferee. In an embodiment, the third party may include but is not limited to platforms such as electronic funds transfers, wire transfers, giro, money orders, peer to peer transfers, merchant processor, online bill payment, bank transfer terminal, Square Cash, Venmo, Chase QuickPay, Zelle, Popmoney, Paypal, Facebook Messenger, Google Wallet, OFX, Western Union, and digital wallet transfer. Transfer data may further include an identifier of data validator device 108; identifier may include a verification datum related to a secure proof identifying data validator device 108 as described in further detail below.

In reference to FIG. 3, at step 310, process authentication node 104 retrieves from an instance of a secure listing a first digitally signed assertion 132. First digitally signed assertion 132 may include at least a second authentication datum, wherein first digitally signed assertion 132 is generated by data validator device 108 as a function of user information. Process authentication node 104 may retrieve from secure listing 128 by sending a transmission to data validator device 108, which may then signal a sequential listing that will subsequently connect with process authentication node 104. Depending on the location and/or network connectivity status of data validator device 108 and/or process authentication node 104, process authentication node 104 may contact the secure listing 128 directly and may not contact data validator device 108; this may be faster and more reliable than attempting to contact data validator device 108. Retrieval may include, without limitation, reference to a hash table, NoSQL database, or similar data structure mapping at least a first authentication datum, or one or more data created using at least a first authentication datum, such as without limitation a cryptographic hash or checksum thereof, to a most recent sublisting and/or other entry in secure listing 128 containing matching or related at least a second authentication datum; this data structure may be updated by any device in system 100 whenever a digitally signed assertion is added to secure listing 128, and may be distributed with secure listing. Any device in system 100 may begin with a point in secure listing matching a location retrieved from data structure and traverse forward in time, for instance by traversing forward through a hash chain included in secure listing, to locate any more recent digitally signed assertions.

With continued reference to FIG. 3, first digitally signed assertion 132 may identify data validator device 108. Identification of data validator device 108 may include information identifying an institution associated with the account associated with the transferor or first party in an asset transfer. This may include information such as the name of the institution, physical address of the institution, the location of data validator device 108, and/or an identification number associated with the institution and/or data validator device 108. Retrieving first digitally signed assertion 132 which identifies the data validator device 108 may help to ensure that fraudulent accounts and/or illegitimate accounts not authorized by recognized institutions are not used to transfer assets. In an embodiment, failure to receive first digitally signed assertion 132 identifying data validator device 108 may indicate that an unrecognized account is being used to transfer assets.

With continued reference to FIG. 3, first digitally signed assertion 132 may include a secure proof, which may include any secure proof as described above, identifying data validator device 108. Secure proof may be generated using trusted hardware of data validator device 108. Trusted hardware may comprise the use of a hardcoded digital circuit, a PUF, and/or a secure computing module. In an embodiment, first digitally signed assertion 132 may be generated using a hardcoded digital circuit. In an embodiment, first digitally signed assertion 132 which identifies data validator device 108 may be generated through the use of a PUF 120. In an embodiment, PUF 120 may create a digital fingerprint that uniquely identifies data validator device 108. In an embodiment, PUT 120 used as trusted hardware to identify data validator device 108 may employ cryptographic measures including generation of public and/or private keys. In an embodiment, first digitally signed assertion 132 may be generated using trusted computing and may involve direct anonymous attestation (DAA) and remote attestation. In some embodiments generation of first digitally signed assertion 132 may also involve unique object fingerprint (UNO). In an embodiment, first digitally signed assertion 132 may include a verification datum related to secure proof; verification datum may be any datum usable to verify authenticity of secure proof. As a non-limiting example, verification datum may include a public key associated with a private key used to sign a digital signature, or a datum usable to evaluate a zero-knowledge proof.

Continuing to look at FIG. 3, data validator device 108 may be linked to an institution operating an account of transferor. Linking the data validator device 108 to an institution operating an account of transferor may include utilizing data validator device 108 that is associated with and/or owned by an institution operating an account of transferor. In an embodiment this may include a data validator device 108 that is owned by an institution operating an account of the transferor. In an embodiment this may comprise a data validator device 108 that is associated with or part of a parent company or sister company of the same institution operating an account of the transferor. In an embodiment, using a data validator device 108 that is owned by the same institution operating an account of the transferor may expediate the account authentication and account balance verification steps of an asset transfer, thus speeding up the asset transfer. Process authentication node 104 may, as a non-limiting example, receive a verification datum associated with data validator device 108 in a record indicating an institution with which data validator device 108 is associated.

With continued reference to FIG. 3, process authentication node 104 may calculate a confidence level in data validator device 108 and/or first digitally signed assertion 132. This may be performed by various methods including reference to varying trust levels associated with various different implementations of data validator device 108 and/or first digitally signed assertion 132. In an embodiment, assigning at least a confidence level includes determining an identity of at least data validator device 108 and/or first digitally signed assertion 132, and assigning the confidence level as a function of the identity of the at least a data validator device 108 and/or first digitally signed assertion 132. Determination of identity of the at least a data validator device 108 and/or first digitally signed assertion 132 may be performed using a trusted third-party (TTP) scheme. In an embodiment, a TPP scheme is a scheme in which a designated entity, such as a certificate authority, as described above monitors and reviews a digital signature passed between two or more communicants, such as process authentication node 104 and at least a data validator device 108. For instance, process authentication node 104 or another device in communication with at least a data validator device 108 may convey to at least a data validator device 108 a "challenge" containing some element of data to which at least a data validator device 108 may respond with a digital signature signing the challenge with a private key. A certificate authority may then attest to the possession of the private key by at least a data validator device 108, thus identifying the at least a data validator device 108 to process authentication node 104. Certificate authority may include, without limitation, a manufacturer of a data validator device 108, in an embodiment, verification of identity of at least a data validator device 108 may be combined with additional identification of process authentication node 104. In an embodiment, a TPP process may be used to establish confidence level in at least a data validator device 108 directly; for instance, a certificate authority may vouch for one or more attributes of at least a data validator device 108, and such voucher may be used, solely or in combination with other processes, to determine the confidence level. Confidence level may be compared to a threshold level. Threshold level may be a predetermined numerical score.

With continued reference to FIG. 3, calculation of a confidence level in first digitally signed assertion 132 may include an evaluation of a secure timestamp. A secure timestamp may contain information pertaining to the current moment when first digitally signed assertion 132 is generated by data validator device 108. In an embodiment, a secure timestamp generated and signed by the at least a sample identifier circuit may be completed by a trusted third party. This may be used, as a non-limiting example, to determine recency of a secure proof or other datum linked to secure timestamp, and/or to prove the existence of certain secure proof or other data before a certain point in time without the possibility that the timestamp can be backdated. In some embodiments, multiple trusted third parties may be used to increase reliability and reduce vulnerability. In some embodiments ANSI ASC X9.95 Standard for trusted timestamps may also be utilized. A timestamp, as used herein, is a cryptographically secure representation reflecting a current moment in time as determined by at least a temporal attester. At least a temporal attester may include a local clock which may be any device used for measurement of time. A timestamp may be created using digital signatures and/or hash functions. In an embodiment, a timestamp may include elements from a hash claim in which a new element contains a hash of previous element and the timestamp is hashed with a regular measurement of time. In an embodiment, a regular measurement of time could be set intervals such as each second or each minute. In an embodiment, a secure timestamp that is closer in time to present day may indicate a fresher evaluation of, for instance, transferor's account balance and/or authentication information, and may result in a higher confidence level being assigned to first digitally signed assertion 132. In an embodiment, a secure timestamp that is farther away in time to present day may indicate a not as fresh evaluation of transferor's account balance and may result in a much lower confidence level. A fresher timestamp may be useful in determining if transferor's account balance is currently available to cover transferor's asset transfer. In some embodiments a fresh timestamp may be more critical in calculating a confidence level, for example when an asset transfer is needed to cover a large purchase such as a house or boat. In some embodiments a fresh timestamp may be less important in calculating a confidence level such as when transferor is looking to purchase a candy bar or sandwich. Calculation of confidence level in data validator device 108 may also include a secondary authentication datum generated by at least a data validator device 108. In an embodiment, a secondary authentication datum generated by at least a data validator device 108 may include a device fingerprint, an IP address, and/or a geolocation. In an embodiment, a secondary authentication datum may assist in calculating an accurate confidence level and aid in determining that at least a data validator device 108 is linked to transferor's account institution. Ultimately such linkage may aid in speeding up authentication and verification of transferor's account balance.

Further referring to FIG. 3, secure timestamp may record a current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using a secure computing module 116. Additional data may include one or more additional data, including sensor data or a hash of data, that are received or generated by temporal attester 104. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g. a hash function, and this hashed output data is sent to a timestamping authority (TSA). A TSA may alternatively or additionally be implemented as a distributed TSA, for instance as described in U.S. Nonprovisional application Ser. No. 16/680,787. The use of secure timestamps as described herein may enable systems and methods as described herein to instantiate attested time. Attested time is the property that a device incorporating a local reference clock may hash data, e.g. sensor data, along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively or additionally, one or more additional participants, such as other remote devices may evaluate confidence levels in at least a remote device or other party generating secure timestamp and/or perform threshold cryptography with a plurality of such parties, each of which may have performed an embodiment of method to produce a secure timestamp. In an embodiment, remote devices or other parties authenticating first digitally signed assertion may perform authentication at least in part by evaluating timeliness of entry and/or generation of a digitally signed assertion as assessed against secure timestamp. In an embodiment, secure proof is generated using an attested computing protocol; this may be performed, as a non-limiting example, using any protocol for attested computing as described above.

With continued reference to FIG. 3, process authentication node 104 and/or data validator device may generate a second digitally signed assertion to alert suspicious activity. In an embodiment, process authentication node 104 and/or data validator device 108 may generate second digitally signed assertion to alert suspicious activity as a function of confidence level and user account information. In an embodiment, a confidence level that fails to meet threshold levels may indicate that an asset transfer is not highly trusted. In an embodiment, a confidence level that does not meet threshold levels by a large margin may be more indicative of suspicious activity. For example, a confidence level that does not meet threshold levels by a large margin may cause data validator device 108 to generate second digitally signed assertion alerting process authentication node 104 to fraudulent and/or suspicious account activity. In an embodiment, a confidence level that does not meet threshold levels by a small margin may not cause data validator device 108 to generate second digitally signed assertion alerting to fraudulent and/or suspicious activity. In an embodiment, failing to meet threshold confidence level by a small margin could indicate insufficient account balance and may not be indicative of fraudulent and/or suspicious activity.

With continued reference to FIG. 3, in an embodiment, process authentication node 104 and/or data validator device 108 may generate second digitally signed assertion to alert suspicious activity as a function of user information. In an embodiment, a large discrepancy in geographical location between a first item posted by at least a first process authentication node 104 and a second transfer posted by a separate process authentication node 104 in a short amount of time may indicate suspicious activity as a function of user information. For example, a first item posted by a process authentication node located geographically in Anchorage, Ak., followed by a second item posted two hours later by a process authentication node in Bangor, Me., may indicate suspicious activity. In an embodiment, a large discrepancy in asset transfer amount between a first item posted by a process authentication node and a second transfer posted by a separate process authentication node in a short amount of time may also indicate suspicious activity as a function of user information. For example, frequently account hackers may perform an asset transfer for a small sum initially to test the account to make sure it really does exist, and then subsequently a short time later perform an asset transfer for a substantially larger sum. In an embodiment, a first item posted by at least a first process authentication node 104 for $5 followed by a second transfer posted by a separate process authentication node 104 one hour later for $20,000 may cause data validator device 108 to generate second digitally signed assertion to alert suspicious activity.

Continuing to refer to FIG. 3, process authentication node 104 and/or data validator device 108 may generate second digitally signed assertion signaling an alert for a maximum transfer amount. In an embodiment, transferor may reach a maximum asset transfer amount comprising a maximum account balance. An asset transfer in excess of account balance may be declined. In an embodiment, an asset transfer may be capped to reflect maximum account balance. In an embodiment, process authentication node and/or data validator device 108 may generate second digitally signed assertion signaling to process authentication node 104 that such maximum balance has been reached. Asset transfers in excess of account balance may not be authorized.

With continued reference to FIG. 3, process authentication node 104 may not be connected by a network to data validator device 108 during performance of one or more steps of method 300. In an embodiment, process authentication node 104 and data validator device 108 may not be able to communicate because of a network failure or lack of network coverage. In such an embodiment, authentication of the asset transfer may still occur using a local copy of secure listing 128. Thus, third-party authentication of asset transfer may not depend on current network connectivity. In an embodiment, a local copy of secure listing 128 may contain timestamps indicating the freshness of secure listing 128; for instance, and without limitation, process authentication node 104 may evaluate one or more secure timestamps included in local copy of secure listing 128 and/or first digitally signed assertion 132 to determine how much time has passed since secure timestamps were created, Process authentication node 104 may use confidence-level determinations as described above to determine whether to authenticate asset transfer; for instance, and without limitation, if a larger time has passed, as determined by secure timestamp, since creation of first digitally signed assertion 132 and/or local copy of secure listing 128, the process authentication node 104 may only authentication transfers for less than a certain value.

Still referring to FIG. 3, comparing the at least a first authentication datum to the at least a second authentication datum may include retrieving a timestamp entry on secure listing 128; timestamp entry may include a secure timestamp as described above. In an embodiment, secure listing 128 may contain a timestamp in reference to the freshness of an asset transfer. A timestamp may provide information such as when and where a transfer took place and may be indicative of how recently in time a transfer may have occurred. A timestamp may be used to determine whether there are sufficient funds to cover the current transfer; for instance, a timestamp indicating a very recent update to secure listing 128 may be used to determine that a posted current balance is accurate and/or current. In an embodiment, retrieving a timestamp entry on secure listing 128 may also occur in reference to a sub listing of secure listing 128; for instance, a timestamp may be used to determine how recently the sublisting was created, permitting a determination that a current balance listed on secure listing is current and/or accurate, even where digitally signed assertion 132 itself was not recently created. In an embodiment, a sublisting with an entry time reference that has not been updated may prompt a series of subsequent actions. One such action may be to do a follow-up authentication check, and to see if an entry time reference hasn't been updated and refreshed recently. Another such action may be that the authorization is not completed and as such the transfer cannot move forward. Another potential action may be that an asset transfer is authorized, but only up to a certain dollar amount. In such an embodiment, any asset transfers exceeding the certain dollar amount may be declined.

With continued reference to FIG. 3, in a non-limiting example, the entry time reference may be a cesium- or rubidium-based atomic clock, active hydrogen maser, GPS disciplined oscillator, precision crystal oscillator, SAW oscillator, quartz oscillator or related that provides microsecond or better timing accuracy. In some embodiments, entry time reference may be used to establish physical distance by inference from latency statistics of nodes in the network, whether using probabilistic, Bayesian or other statistical methods, machine learning classifiers or other. In some embodiments, changes in inferred physical distance or latency between nodes in the graph may be used to flag potentially compromised secure computing modules, man in the middle or other attacks.

Continuing to refer to FIG. 3, process authentication node 104 may evaluate freshness of a local copy of secure listing 128. In an embodiment, process authentication node 104 may evaluate the freshness of a local copy of secure listing 128 to determine if it has recently been updated to reflect having recent transfers posted on it. In turn, this may count as a measure of whether the current transfer should be authorized by process authentication node 104. A local copy of secure listing 128 that has been updated may assist in speeding up transfers. A local copy of secure listing 128 that is not as fresh and has an older timestamp or timestamps associated therewith may result in a transfer not being authorized by process authentication node 104. In an embodiment, the freshness of a local listing of secure listing 128 may weigh more heavily in evaluating some confidence levels than others. In an embodiment an asset transfer to purchase a $2 snack may not require the same level of freshness of a local secure listing 128 as an asset transfer to purchase a $50,000 automobile. In an embodiment, differences in freshness may be accounted for when calculating a confidence level which includes in the calculation the freshness of a local secure listing 128. By influencing confidence level, freshness of a local secure listing 128 may impact whether or not a transfer may proceed.

Still referring to FIG. 3, at step 315, process authentication node 104 compares the at least a first authentication datum to the at least a second authentication datum. In an embodiment, a digital signature in first digitally signed assertion may be evaluated. Signature may be evaluated using a verification datum, including without limitation by decrypting the encrypted mathematical representation in the digital signature using a public key corresponding to a private key used to encrypt the digital signature, and comparing the decrypted representation to the representation the digital signature is presented as signing.

Still referring to FIG. 3, at least a second authentication datum may include a cryptographic hash of authentication information. Cryptographic hash may be generated, as a non-limiting example, by data validator device 108. Comparing at least a first authentication datum to at least a second authentication datum may include cryptographically hashing the at least a first authentication datum; this may, for instance, enable a representation of correct authentication information to be posted in first digitally signed assertion 132 without revealing contents of such correct authentication information to other parties. In an embodiment, process authentication node 104, and potentially other participants in system 100, may have stored in memory a common algorithm for arrangement and hashing of authentication information, to ensure that cryptographic hashes of relevant data are created in a uniform way, permitting accurate comparison for authentication. Alternatively or additionally, at least a first authentication datum may be received in a cryptographically hashed form and compared to cryptographically hashed at least a second authentication datum. In an embodiment, hashes that have been generated may be compared. Because it may be difficult to reconstruct data from a hashing algorithm or decrypt a hash, the hashes themselves may be compared to check for differences. Any slight difference in the original data may result in a different hash being produced. By using such a method, checking a first authentication datum consisting of a hash to a second authentication datum consisting of a hash should result in the same hash being generated. Any slight difference in a hash may indicate tampering of the data.

Still referring to FIG. 3, secure listing 128 may be encrypted. In an embodiment, secure listing 128 may be encrypted to prevent unauthorized parties from being able to alter or steal information contained within secure listing 128. Further, encryption may allow for only trusted devices with high confidence levels to be able to access data in temporarily sequential listing. These trusted devices, including process authentication node 104 and data validator device 108 may be devices with high confidence levels, verified using trusted hardware. Each such trusted device may be associated with an institution or entity authorized to perform asset transfers, such as participants in credit card payment processes or the like. In an embodiment, highly trusted devices may share a decryption key, such that each such device, including without limitation process authentication nodes and/or data validator devices, authorized to perform any portion of asset transfers as described herein may be able to access data of secure listing, while other devices may be unable to access the data.

With continued reference to FIG. 3, and as noted above, comparing at least a first authentication datum to at least a second authentication datum may involve retrieving information from a local secure listing 128. In an embodiment, when process authentication node 104 utilizes a local secure listing 128, a network transmission does not have to be sent to any remote device to independently verify the authenticity of asset transfer; the comparison may be possible without any network connectivity at all, or where only a local network of, for instance, point-of-sale devices in a store is available. By utilizing a local secure listing 128 for account authentication and verification, process authentication node 104 may work without a network connection and perform asset transfers much more quickly and robustly, allowing for almost instantaneous verification.

Still referring to FIG. 3, first digitally signed assertion 132 may contain a current balance amount. In an embodiment, secure listing 128 may contain a ledger that tracks each asset transfer, keeping a record of each transfer and updating the ledger to provide the most current balance amount. This may allow for quicker processing time of transfers as compared to standard asset transfers that may take several days to check and update current balance amounts. In an embodiment, the leger may contain a timestamp of each asset transfer posted to the ledger, allowing each transfer to be posted in chronological order and preventing alterations of time entry of an asset transfer on the ledger; timestamp may include a secure timestamp as described above.

Still referencing FIG. 3, process authentication node 104 may compare an asset transfer amount to the current balance amount. In an embodiment, a process authentication node and/or a data validator device, may update secure listing 128 to reflect a most current balance of transferor. When an asset transfer presents for processing at process authentication node 104, process authentication node 104 may compare the asset transfer amount to transferor's balance amount reflected on the secure recurrent ledger. In an embodiment, if an asset transfer amount exceeds transferor's balance amount, then process authentication node 104 may prohibit the asset transfer from going forward. If, however, transferor's balance amount exceeds asset transfer amount then the asset transfer may proceed. In an embodiment, if asset transfer amount exceeds transferor's balance, then process authentication node 104 may approve the transfer up to a certain dollar amount which may be transferor's total account balance or some portion thereof. Any transfers or cumulative transfers that exceed transferor's account balance may be declined. Where a local copy of secure listing 128 is being used, process authentication node 104 may weigh or otherwise reduce account balance, for the purposes of comparison, according to recency of first digitally signed assertion 132 and/or local copy of secure listing 128; for instance, where first digitally signed assertion 132 including an account balance is an hour old, and no network connectivity has been available during that hour, process authentication node 104 may compare transfer amount to half of current balance. In an embodiment, process authentication node 104 may refuse any transfer where first digitally signed assertion 132, subsequent digitally signed assertions indicating other asset transfers and/or amounts thereof, and/or secure listing 128 is older than a threshold amount, as determined by reference to timestamps.

In reference to FIG. 3, at step 320, process authentication node 104 authenticates the transfer data as a function of the comparison of the at least a first authentication datum to the at least a second authentication datum. Authentication may include determining that a first authentication datum, or a datum derived therefrom including without limitation a cryptographic hash, is equivalent to a second authentication datum. Process authentication node 104 may additionally enter an initial digitally signed assertion attesting to one or more elements of identification and/or authentication of transferor. This initial digitally signed assertion may then be compared to a second digitally signed assertion that data validator device 108 may enter, also attesting to one or more elements of identification and/or authentication of transferor. Process authentication node 104 may compare each element of identification and authenticate the transfer as a function of the comparison.

Still referring to FIG. 3, process authentication node 104 may determines that the current balance exceeds the asset transfer amount and approves the transfer. Process authentication node 104 may approve an asset transfer when transferor's current balance is greater than the asset transfer amount. Process authentication node 104 may prohibit the asset transfer when transferor's balance amount is less than the asset transfer amount; process authentication node 104 may compare the asset transfer amount to a current balance weighted according to recency, or otherwise accounting for freshness or recency as described above. In an embodiment, when asset transfer has been approved, and transferor's balance amount is greater than the asset transfer amount, then the transfer may continue, with transferor's balance then being updated on secure listing 128, as described in more detail below. In an embodiment, when asset transfer has not been approved, then the transfer may not move forward. In an embodiment when the asset transfer amount exceeds account balance, an asset transfer may be approved for less than or equal to account balance. In an embodiment, an asset transfer may be approved for up to a certain dollar amount.

Still referring to FIG. 3, an approved transfer may generate at process authentication node 104 second digitally signed assertion containing an asset transfer amount of the asset transfer and add second digitally signed assertion to secure listing 128. In an embodiment, after it has been confirmed that the balance amount exceeds the asset transfer amount, process authentication node 104 may generate second digitally signed assertion containing an asset transfer amount of the asset transfer. In an embodiment, second digitally signed assertion may then be added to secure listing 128. In an embodiment, adding to secure listing 128 may include adding a sublisting to secure listing 128. This process may occur almost simultaneously, thereby reducing the normal three to five day waiting period for a transfer to post to an account. Subsequent devices, including without limitation process authentication node 104 and/or data validator device 108, may evaluate one or more such postings of asset transfer amount to determine an updated current balance, permitting subsequent determination of approved asset transfer amounts. Any addition to secure listing 128 may be encrypted using an encryption key used to encrypt any other portion or the entirety of secure listing 128.

Figure 4:
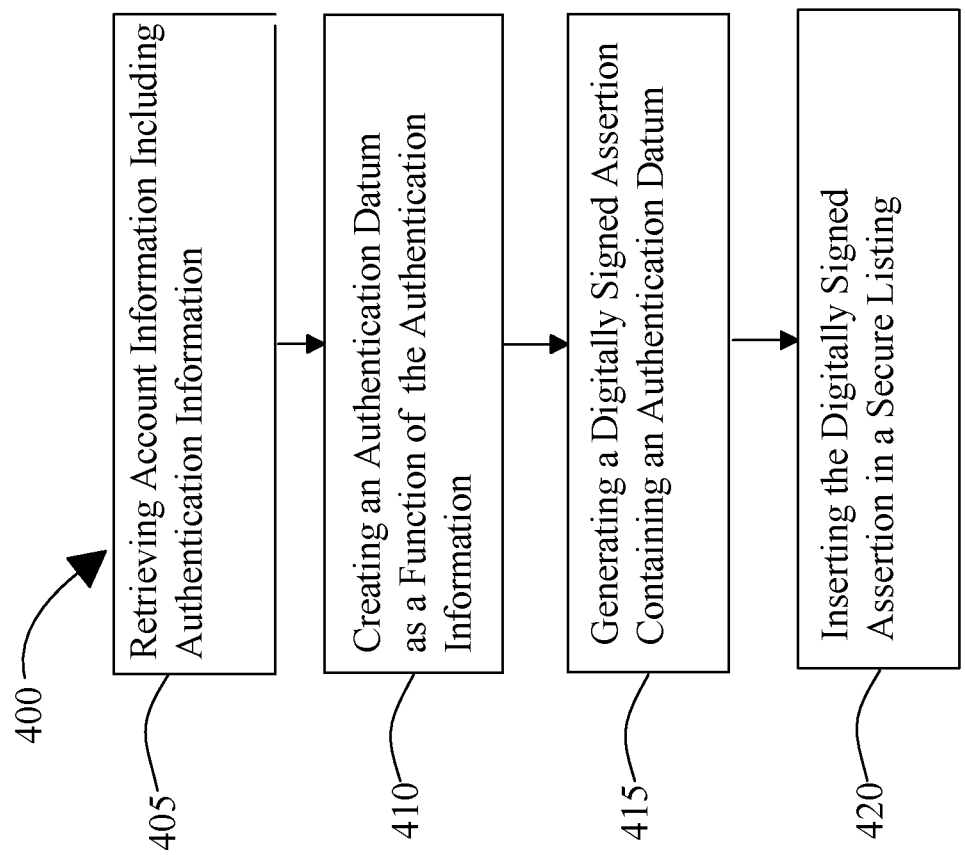

Referring now to FIG. 4, an exemplary embodiment of a method 400 of remotely pre-authorizing asset transfers. At step 405, data validator device 108 retrieves account information of transferor, including authentication information. Data validator device 108 may be a device operated by a third party to perform asset transfers as defined herein, including without limitation a device operated by a bank or similar institution. Data validator device 108 may retrieve account information of a transferor including any data used to aid in the authentication of account information, which may be stored, without limitation in a database or other data store in memory of data validator device 108 and/or a device in communication with the data validator device 108; the device in communication with the data validator device 108 may also be operated by an institution operating data validator device 108. Authentication information may include cardholder identification information such as transferor name and/or identity, transferor banking information, transferor bank account numbers, and/or account balance information. Authentication data may include, without limitation, a verification datum used to verify any secure proof as previously described, including without limitation a public key associated with a private key used to perform a digital signature. Retrieving account information by data validator device 108 may occur with communications between data validator device 108 and secure processor 124. In addition, data validator device 108 may communicate with process authentication node 104 and/or secure listing 128 to retrieve account information.

With continued reference to FIG. 4, at step 410, data validator device 108 creates at least an authentication datum as a function of the authentication information. An authentication datum may be generated from authentication information as described above in reference to FIGS. 1-3. In an embodiment, the authentication datum may comprise cryptographically hashed authentication information. In an embodiment, this may, for instance, enable a representation of correct authentication information to be posted in first digitally signed assertion 132 without revealing contents of such correct authentication information to other parties. In an embodiment, cryptographically hashing authentication information may add another level of security and may help protect deter potential malicious actors.

With continued reference to FIG. 4, at step 415, data validator device 108 generates digitally signed assertion 132 containing at least an authentication datum. Generating digitally signed assertion 132 may be performed using any process or process step as described above for generation of digitally signed assertions.

With continued reference to FIG. 4, generating digitally signed assertion 132 may involve receiving and/or generating a secure timestamp, for instance as described above in reference to FIGS. 1-3, and generating digitally signed assertion 132 containing the secure timestamp. A secure timestamp may contain information pertaining to the current moment when first digitally signed assertion 132 is generated by data validator device 108. In an embodiment, a secure timestamp signed by the data validator device 108 may be completed using a trusted third party. This may be used, as a non-limiting example, to determine recency of a secure proof or other datum linked to secure timestamp, and/or to prove the existence of certain secure proof or other data before a certain point in time without the possibility that the timestamp can be backdated. In some embodiments, multiple trusted third parties may be used to increase reliability and reduce vulnerability.

Still referring to FIG. 4, account information used to generate digitally signed assertion 132 may include current balance information. In an embodiment, balance information may include transferor's current account balance. In an embodiment, digitally signed assertion 132 containing balance information may communicate such information with secure listing 128. In an embodiment, this may assist in speeding up third party authentication of asset transfer by eliminating checking account balance with data validator device 108. In yet another embodiment, secure listing 128 may receive asset transfer amount, modify the current balance to reflect asset transfer amount, and create digitally signed assertion 132 to reflect the modified current balance. In such an embodiment, creating digitally signed assertion 132 to reflect modified current balance allows for updating account balance on secure listing 128. This may assist in speeding up third party authentication of asset transfers by reflecting modified current balance on secure listing 128. In such an embodiment, balances can be updated more efficiently to prevent passing modified balance amounts through data validator device 108.

Continuing to refer to FIG. 4, digitally signed assertion 132 may be generated using trusted hardware. Trusted hardware may comprise the use of a hardcoded digital circuit, a PUF, and/or a secure computing module 112, for instance as described above in FIG. 1. Trusted hardware may include devices that have high confidence levels. Confidence levels may indicate a level of trustworthiness. Devices meeting a threshold level of trustworthiness may be utilized. Devices failing to meet a threshold level of trustworthiness may not be utilized.

With continued reference to FIG. 4, at step 420, digitally signed assertion 132 is inserted in secure listing 128. Inserting may involve incorporating digitally signed assertion 132 into secure listing 128 according to any process or process steps as described above in reference to FIGS. 1-3; for instance, and without limitation, this may involve adding a sublisting to secure listing 128. Inserting digitally signed assertion 132 may further include encrypting digitally signed assertion, a sublisting, and/or secure listing. Inserting digitally signed assertion 132 into secure listing 128 may allow for information contained in digitally signed assertion 132 to be updated and reflected by secure listing 128. In an embodiment, this may aid in speeding up third party authentication of asset transfer.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
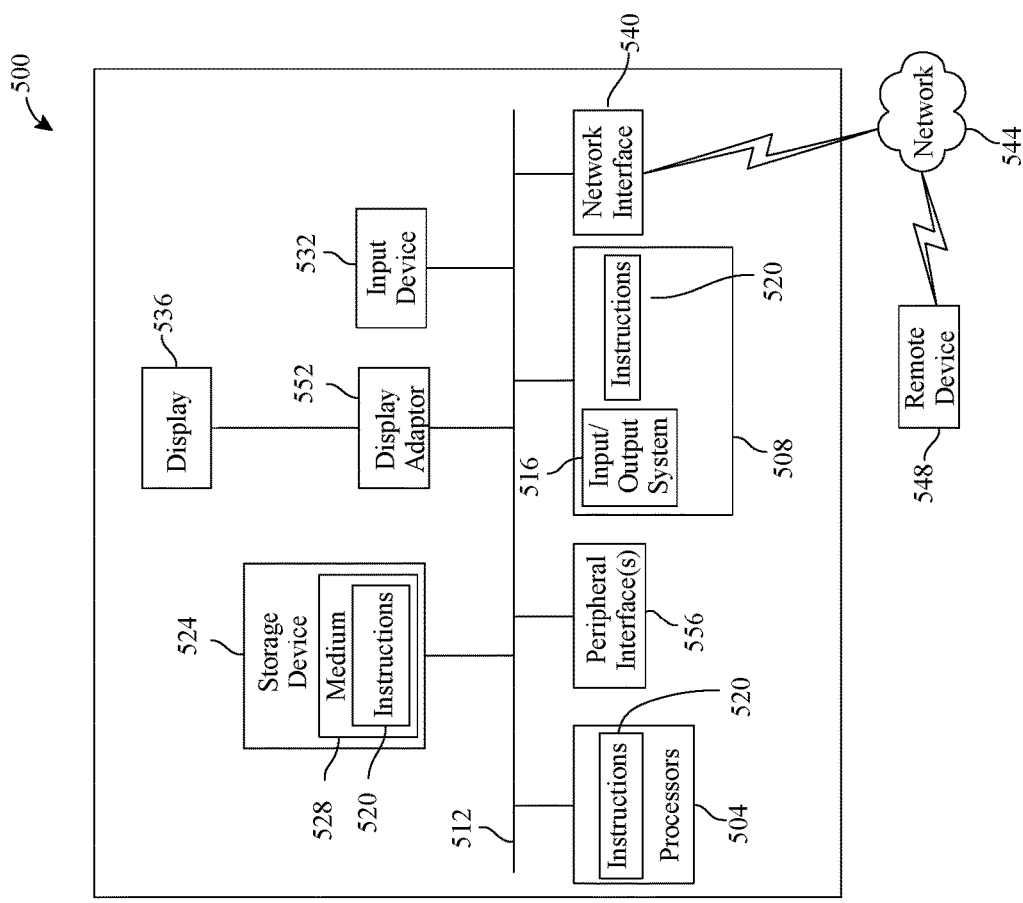
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Memory 508 may include various components (e.g., machine-readable media) including, but not limited to, a random-access memory component, a read only component, and any combinations thereof.

In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alphanumeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 400 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

Continuing to look at FIG. 3, secure listing 128 may contain a series of process authentication nodes. In an embodiment, a series of process authentication nodes may contain a plurality of process authentication nodes. In an embodiment, a plurality of process authentication nodes located on secure listing 128 may allow for multiple asset transfers to occur simultaneously. In an embodiment, an asset transfer at a first process authentication node may occur while at the same time a second asset transfer may occur at a second process authentication node. In an embodiment, a plurality of process authentication nodes provide additional levels of security by having additional verifications of accounts. In an embodiment, having a plurality of process authentication nodes on secure listing 128 may also allow for simultaneous updates from an institution and allow an institution to generate an approval at more than one process authentication node.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of efficient cryptographic third-party authentication of an asset transfer, the method comprising:
receiving, at a process authentication node, transfer data relating to an asset transfer, wherein the transfer data includes at least a first authentication datum, and wherein the first authentication datum includes an authorization token;
retrieving, by the process authentication node, from an instance of a secure listing, a first digitally signed assertion including at least a second authentication datum, wherein the first digitally signed assertion is generated by a data validator device as a function of information of a transferring entity;
comparing, by the process authentication node, the at least a first authentication datum to the at least a second authentication datum wherein comparing the at least a first authentication datum to the at least a second authentication datum further comprises retrieving the at least a second authentication datum from a locally stored instance of the secure listing; and
authenticating, by the process authentication node, the transfer data as a function of the comparing of the at least a first authentication datum to the at least a second authentication datum, wherein the process authentication node includes a physically unclonable function (PUF).

2. The method of claim 1 further comprising receiving a secure proof associated with the transferring entity.

3. The method of claim 1, wherein the first digitally signed assertion identifies the data validator device.

4. The method of claim 3, wherein the first digitally signed assertion is generated by the data validator device using trusted hardware.

5. The method of claim 1 further comprising determining a confidence level in the data validator device.

6. The method of claim 5, wherein determining the confidence level further comprises cryptographically validating a secure timestamp.

7. The method of claim 1, wherein the process authentication node and the data validator device are not connected by a network.

8. The method of claim 1 further comprising cryptographically validating freshness of a local copy of the secure listing.

9. The method of claim 1, wherein the at least a second authentication datum further comprises a cryptographic hash of authentication information, and comparing the at least a first authentication datum to the at least a second authentication datum further comprises cryptographically hashing the at least a first authentication datum.

10. A system for efficient third-party authentication of asset transfers using trusted computing, the system including a process authentication node, the process authentication node including a processor, the process authentication node configured to:
receive transfer data relating to an asset transfer, wherein the transfer data includes at least a first authentication datum, and wherein the first authentication datum includes an authorization token;
retrieve, from an instance of a secure listing, a first digitally signed assertion including at least a second authentication datum, wherein the first digitally signed assertion is generated by a data validator device as a function of information of a transferring entity;
compare the at least a first authentication datum to the at least a second authentication datum, wherein comparing the at least a first authentication datum to the at least a second authentication datum further comprises retrieving the at least a second authentication datum from a locally stored instance of the secure listing; and
authenticate the transfer data as a function of the comparing of the at least a first authentication datum to the at least a second authentication datum, wherein the process authentication node includes a physically unclonable function (PUF).

11. The system of claim 10, wherein the process authentication node is further configured to receive a secure proof associated with the transferring entity.

12. The system of claim 10, wherein the first digitally signed assertion identifies the data validator device.

13. The system of claim 12, wherein the first digitally signed assertion is generated by the data validator device using trusted hardware.

14. The system of claim 10, wherein the process authentication node is further configured to determine a confidence level in the data validator device.

15. The system of claim 14, wherein determining the confidence level further comprises cryptographically validating a secure timestamp.

16. The system of claim 10, wherein the process authentication node and the data validator device are not connected by a network.

17. The system of claim 10 wherein the process authentication node is further configured to cryptographically validate freshness of a local copy of the secure listing.

18. The system of claim 10, wherein the at least a second authentication datum further comprises a cryptographic hash of authentication information, and comparing the at least a first authentication datum to the at least a second authentication datum further comprises cryptographically hashing the at least a first authentication datum.

* * * * *